US009600258B2

(12) United States Patent
Ramachandran et al.

(10) Patent No.: US 9,600,258 B2
(45) Date of Patent: Mar. 21, 2017

(54) SUGGESTIONS TO INSTALL AND/OR OPEN A NATIVE APPLICATION

(71) Applicant: Google Inc., Mountain View, CA (US)

(72) Inventors: Vinod Kumar Ramachandran, Sunnyvale, CA (US); Grace Kloba, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 45 days.

(21) Appl. No.: 14/181,588

(22) Filed: Feb. 14, 2014

(65) Prior Publication Data
US 2015/0234645 A1    Aug. 20, 2015

(51) Int. Cl.
*G06F 9/445*    (2006.01)
(52) U.S. Cl.
CPC .............. *G06F 8/61* (2013.01); *G06F 9/445* (2013.01)
(58) Field of Classification Search
None
See application file for complete search history.

(56) References Cited

U.S. PATENT DOCUMENTS

| 8,396,759 B2* | 3/2013 | Mehta et al. ............... 705/26.7 |
| 8,650,263 B2* | 2/2014 | Snyder .......................... 709/217 |
| 8,825,663 B2* | 9/2014 | Mahaniok et al. ........... 707/741 |
| 2006/0100956 A1* | 5/2006 | Ryan et al. .................... 705/37 |
| 2006/0106806 A1* | 5/2006 | Sperling ................... G06F 8/65 |
| 2007/0027857 A1* | 2/2007 | Deng et al. ....................... 707/3 |
| 2008/0147856 A1* | 6/2008 | Lee ................... G06Q 30/0601 709/224 |
| 2009/0083232 A1* | 3/2009 | Ives et al. ......................... 707/3 |
| 2010/0211587 A1 | 8/2010 | Ali et al. |
| 2010/0306191 A1* | 12/2010 | LeBeau ............ G06F 17/30864 707/723 |
| 2012/0023097 A1 | 1/2012 | LeBeau et al. |
| 2012/0117504 A1* | 5/2012 | Lemay et al. ................ 715/772 |

(Continued)

FOREIGN PATENT DOCUMENTS

KR    10-2013-0059738 A    6/2013

OTHER PUBLICATIONS

"Promoting Apps with Smart App Banners," <https://developer.apple.com/library/ios/documentation/AppleApplications/Reference/SafariWebContent/PromotingAppswithAppBanners/PromotingAppswithAppBanners.html>, Oct. 22, 2013, 3 pgs.

*Primary Examiner* — Isaac T Tecklu
(74) *Attorney, Agent, or Firm* — McDermott Will & Emery LLP

(57) ABSTRACT

A system and method are provided for providing suggestions to install native applications, the method including accessing a website on an application running on an electronic device, the website comprising metadata, obtaining, from the metadata, a unique identifier of a native application for downloading from a server, transmitting, to a server, a request for identifying information of the native application, the request including the obtained unique identifier, receiving, from the server and in response to the transmitting, the identifying information, displaying within a user interface at least part of the identifying information and a graphical component for installing the native application, receiving user selection of the graphical component, and initiating, in response to receiving the user selection, an inline installation of the native application between the server and the electronic device.

25 Claims, 23 Drawing Sheets

(56) References Cited

U.S. PATENT DOCUMENTS

| | | | |
|---|---|---|---|
| 2012/0291022 A1* | 11/2012 | Mehta | G06F 8/60 717/176 |
| 2012/0323898 A1 | 12/2012 | Kumar et al. | |
| 2013/0227539 A1* | 8/2013 | D'Aurelio | G06F 17/30893 717/169 |
| 2013/0325340 A1* | 12/2013 | Forstall | G01C 21/00 701/533 |
| 2014/0066029 A1* | 3/2014 | Brennan | H04W 4/00 455/414.1 |
| 2014/0068589 A1* | 3/2014 | Barak | G06F 9/445 717/170 |
| 2014/0282118 A1* | 9/2014 | Kumamoto | G06F 3/0481 715/760 |

* cited by examiner

SUGGESTIONS TO INSTALL AND/OR OPEN A NATIVE APPLICATION

BACKGROUND

The present disclosure generally relates to native applications, and in particular, to providing suggestions to install and/or open native applications.

A native application is a software application designed to run on smartphones, tablet computers, desktop computers and other computing devices. Typically, a computing device offers an array of native applications to a user. These native applications may be free or purchased through an application store and installed at the user's computing device.

SUMMARY

The disclosed subject matter relates to a system for providing a suggestion to open a native application. The system comprises one or more processors, and a machine-readable medium comprising instructions stored therein, which when executed by the processors, cause the processors to perform operations comprising receiving input from a user via a search field of an application, the input including at least partial entry of a search term. The operations comprise obtaining one or more search term predictions corresponding to the user input. The operations further comprise determining that a native application corresponds to the user input, wherein the native application is installed on the electronic device. The operations further comprise displaying the one or more search term predictions, together with a suggestion to open the native application, as user-selectable entries in association with the search field.

The disclosed subject matter relates to a machine-implemented method of providing a suggestion to open a native application. The method comprises receiving user input via a search field of an application running on an electronic device, the input including at least partial entry of a search term. The method further comprises obtaining one or more search term predictions corresponding to the user input. The method further comprises determining that a native application corresponds to the user input, wherein the native application is installed on the electronic device. The method further comprises displaying the one or more search term predictions, together with a suggestion to open the native application, as user-selectable entries in association with the search field. The method further comprises receiving user selection of the suggestion to open the native application. In addition, the method comprises opening, in response to receiving the user selection, the native application.

The disclosed subject matter further relates to a system for providing an interface to install an application. The system comprises one or more processors, and a machine-readable medium comprising instructions stored therein, which when executed by the processors, cause the processors to perform operations comprising accessing a website on an application, the website comprising metadata. The operations comprise obtaining, from the metadata, a unique identifier of a native application for downloading from a server. The operations further comprise transmitting, to the server, a request for identifying information of the native application, the request including the obtained unique identifier. The operations further comprise receiving, from the server and in response to the transmitting, the identifying information. The operations further comprise displaying within a user interface at least part of the identifying information and a graphical component for installing the native application.

The disclosed subject matter further relates to a machine-implemented method of providing an interface to install an application. The method comprises accessing a website on an application running on an electronic device, the website comprising metadata. The method further comprises obtaining, from the metadata, a unique identifier of a native application for downloading from a server. The method further comprises transmitting, to the server, a request for identifying information of the native application, the request including the obtained unique identifier. The method further comprises receiving, from the server and in response to the transmitting, the identifying information. The method further comprises displaying within a user interface at least part of the identifying information and a graphical component for installing the native application. The method further comprises receiving user selection of the graphical component. In addition, the method comprises initiating, in response to receiving the user selection, an inline installation of the native application between the server and the electronic device.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several embodiments of the subject technology are set forth in the following figures.

DETAILED DESCRIPTION

Figure 1:
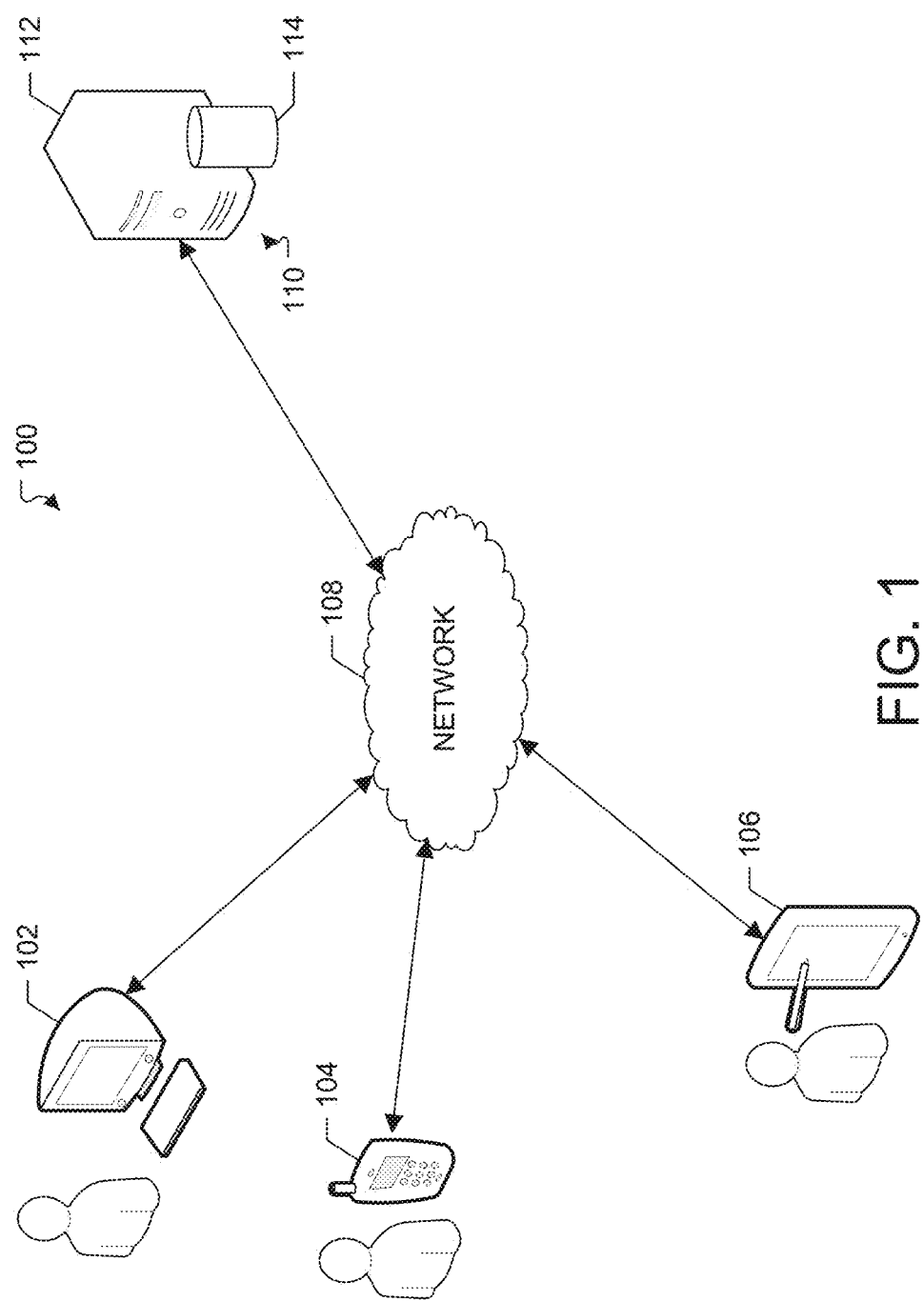
FIG. 1 illustrates an example network environment in which information can be provided for suggesting installing and/or opening a native application.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

As noted above, a native application is a software application designed to run on smartphones, tablet computers, desktop computers and other computing devices. Typically, a computing device offers an array of native applications to a user. These native applications may be free or purchased through an application store and installed at the user's computing device.

Various websites accessible through a web application at the computing device also provide functionality similar to a native application. However, these websites are typically developed for the web and thus only accessible through the web application (e.g., web browser application). Web developers may promote one or more native applications that correspond to their websites. For example, the formats of promoting the one or more native applications may correspond to full screen interstitials. These promotions appear on a website even when the user has already installed the one or more native applications corresponding to the website.

The subject disclosure provides suggestions to install a native application. In some aspects, a website comprising metadata is accessed on an application running on a system. A unique identifier of a native application on the system is obtained for downloading from a server. A request for identifying information of the native application is transmitted to the server, the request including the obtained unique identifier. In response to the transmitted request, the identifying information is received from the server. In example aspects, the identifying information comprises at least one of a name, one or more social annotations, one or more user ratings, or a price of the native application. At least part of the identifying information and a graphical component for installing the native application are displayed within a user interface. In some aspects, the user interface is displayed as an overlay relative to the application. In example aspects, the system refrains from re-directing to an installation page for the native application on the server.

Alternatively or in addition, the subject disclosure provides suggestions to open a native application. In some aspects, an input is received from a user via a search field of an application running on a system, the input including at least partial entry of a search term. One or more search term predictions are obtained corresponding to receiving the user input. A determination is made that a native application corresponds to the user input and the native application is installed on the system. The one or more search term predictions, together with a suggestion to open the native application are displayed within the application, as user-selectable entries in association with the search field. In some aspects, the one or more search term predictions comprise at least one uniform resource locator (URL) suggestion corresponding to the user input. In example aspects, determining that the native application corresponds to the user input comprises identifying, from among plural native applications on the system, the native application as being configured to handle the at least one URL. In some implementations, the identifying comprises filtering out native applications corresponding to web browsers configured to handle the at least one URL.

FIG. 1 illustrates an example network environment in which information can be provided for suggesting installing and/or opening a native application. A network environment 100 includes computing devices 102, 104 and 106 (hereinafter "102-106") and computing system 110 (hereinafter "110-112"). Computing devices 102-106 and computing system 110 can communicate with each other through a network 108. Computing system 110 can include one or more computing devices 112 (e.g., one or more servers), and one or more computer-readable storage devices 114 (e.g., one or more databases).

Each of computing devices 102-106 can represent various forms of processing devices. Example processing devices can include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any these data processing devices or other data processing devices. Computing devices 102-106 and 112 may be provided access to or receive application software executed or stored on any of the other computing systems 102-106 and 112.

Computing device 112 may be any system or device having a processor, a memory, and communications capability for providing content to the electronic devices. In some example aspects, server 110 can be a single computing device, for example, a computer server. In other embodiments, server 110 can represent more than one computing device working together to perform the actions of a server computer (e.g., cloud computing). Further, computing device 112 can represent various forms of servers including, but not limited to a web server, an application server, a proxy server, a network server, or a server farm.

In some aspects, the computing devices may communicate wirelessly through a communication interface (not shown), which may include digital signal processing circuitry where necessary. The communication interface may provide for communications under various modes or protocols, for example, Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, for example, using a Bluetooth, WiFi, or other such transceiver.

In some aspects, network environment 100 can be a distributed client/server system that spans one or more networks, for example, network 108. Network 108 can be a large computer network, for example, a local area network (LAN), wide area network (WAN), the Internet, a cellular network, or a combination thereof connecting any number of mobile clients, fixed clients, and servers. Further, the network 108 can include, but is not limited to, any one or more of the following network topologies, including a bus network, a star network, a ring network, a mesh network, a star-bus network, tree or hierarchical network, and the like. In some aspects, communication between each client (e.g., computing devices 102-106) and server (e.g., server 110) can occur via a virtual private network (VPN), Secure Shell (SSH) tunnel, or other secure network connection. In some aspects, network 108 may further include a corporate network (e.g., intranet) and one or more wireless access points.

In example aspects, server 110 is a search engine which can provide search results in response to a search term received from one or more client devices (e.g., computing devices 102-106). For example, processing device 112 executes computer instructions stored in data store 114, for example, to host a search engine website. A user of any of computing devices 102-106 can enter a search term/query via a search field of an application (e.g., web browser) on the computing device. The search engine of server 110 can perform a web-based using the search term entered by the user as input, and provide the results of the search to the computing device 102-106.

In example aspects, the client device (e.g., any of computing devices 102-106), in conjunction with a server (e.g., server 110), provides for suggesting installing and/or opening a native application.

In some aspects, a website comprising metadata is accessed on an application running on the client device (e.g., any of computing devices 102-106). The metadata comprises a metatag or HTML code for identifying a native application. A unique identifier of a native application is obtained for downloading from the server. A request for identifying information of the native application is transmitted to the server, the request including the obtained unique identifier. Alternatively or in addition, the request for identifying information of the native application may be sent to a digital distribution platform for applications on the client device. In response to the transmitted request, the identifying information is received from the server. Alternatively or in addition, the identifying information may be received from the digital distribution platform for applications on the client device. In example aspects, the identifying information comprises at least one of a name, one or more social annotations, one or more user ratings, or a price of the native application. The client device provides for display of at least part of the identifying information and a graphical component for installing the native application within a user interface on the client device. In some aspects, the user interface is displayed as an overlay relative to the application on the client device. In some implementations, the system refrains from re-directing to an installation page for the native application on the server.

In some additional aspects, the client device (e.g., any of computing devices 102-106) receives input from a user via a search field of an application running on the client device (e.g., a web browser running on the client device). The search field can be configured to receive user input for a web-based search, the input including at least partial entry of a search term. The client device obtains one or more search term predictions corresponding to the user input. In example aspects, the one or more search term predictions are obtained from the search engine server 110. A determination is made that a native application corresponds to the user input and the native application is installed on the client device. The client device provides for display of the one or more search term predictions, together with a suggestion to open the native application are displayed within the application on the client device, as user-selectable entries in association with the search field. In some implementations, the one or more search term predictions comprise at least one uniform resource locator (URL) suggestion corresponding to the user input. In some aspects, determining that the native application corresponds to the user input comprises identifying, from among plural native applications on the client device, the native application as being configured to handle the at least one URL. In example aspects, the identifying comprises filtering out native applications corresponding to web browsers configured to handle the at least one URL.

Figure 2:
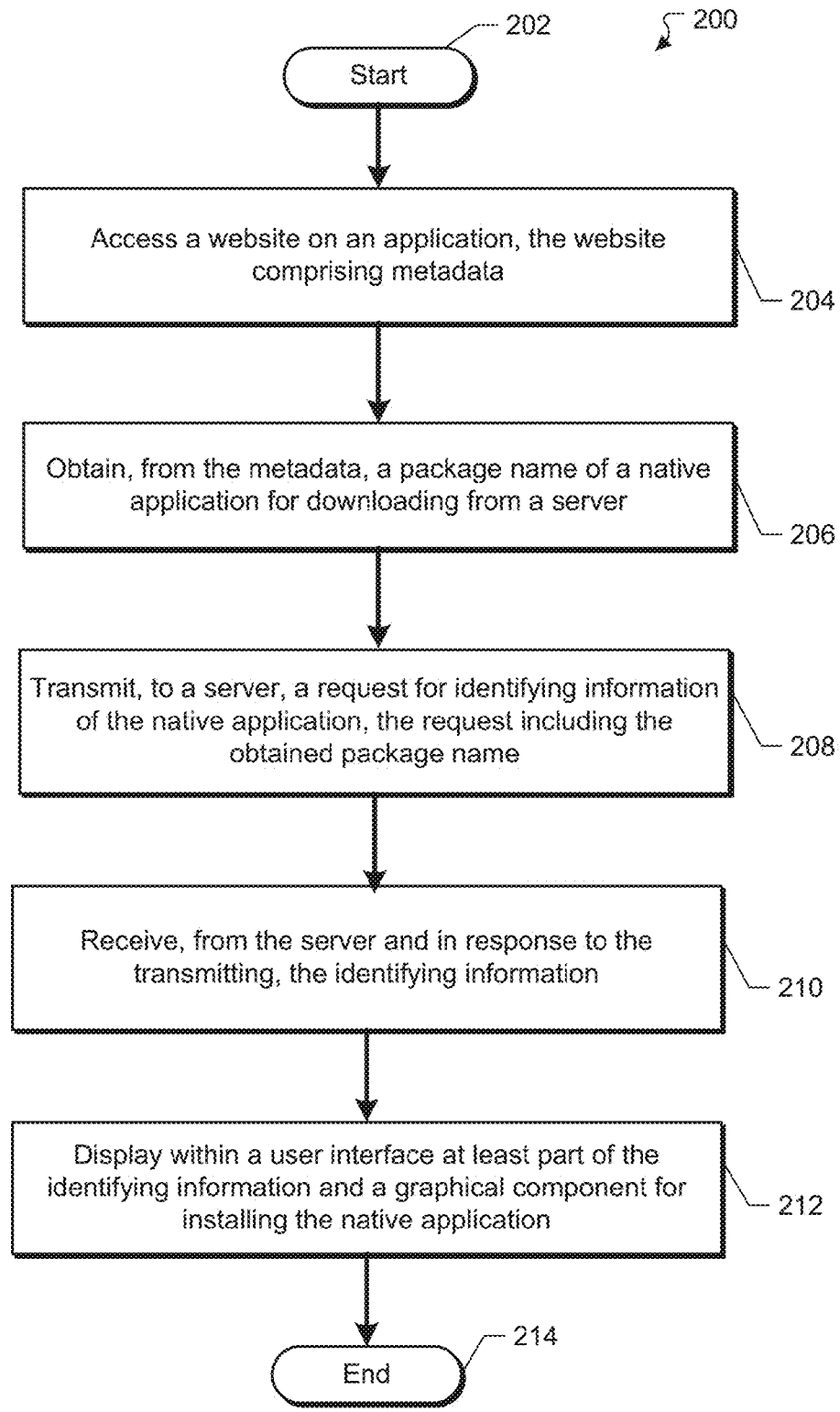
FIG. 2 illustrates a flow diagram of an example process for providing an interface to install a native application.

FIG. 2 illustrates a flow diagram of an example process for providing an interface to install a native application. Following start block 202, a website is accessed on an application on a system, the website comprising metadata, at step 204. The application can be a web browser application. In some aspects, the application can be a search application (e.g., an application for accessing web content via a search field). Alternatively or in addition, the application may be a video application, a social networking application, an email application, a map application and/or similar applications running on the system. In some aspects, metadata included in the website contains at least a unique identifier, such as a package name of a native application. Metadata can be a meta tag or HTML code for identifying a native application, for example, in the form of <meta name="mobile-app-install-alert" content="com.native appname.operating system"/>, which may be added by a website developer to serve as a native application indicator for the website.

At step 206, from the metadata, a unique identifier of a native application is obtained for downloading from a server. The unique identifier of the native application may be obtained from the metadata at step 204.

At step 208, a request for identifying information of the native application is transmitted to the server, the request including the obtained unique identifier. Alternatively or in addition, the request for identifying information of the native application may be sent to a digital distribution platform for applications on the system. A native application may be identified corresponding to the obtained unique identifier at the server. The identifying information can comprise at least one of a name, one or more social annotations, one or more user ratings, and/or a price of the native application. In some aspects, one or more social annotations can include, for example, "<Text of the review from a friend>", "<friend> rated it<N> stars", "<friend/s>+1'd it", "similar to <app name>" (e.g., based on other native applications installed), "popular with similar users", "popular in your area", and "top application". The identifying information of the native application may be retrieved by an application programming interface (API) of a digital distribution platform for applications. In example aspects, the API is not available to web developers.

At step 210, in response to the transmitted request, the identifying information is received from the server. Alternatively or in addition, the identifying information may be received from the digital distribution platform for applications on the system. At step 212, at least part of the identifying information and a graphical component for installing the native application are displayed within a user interface in the system. The user interface in the system may comprise native code and/or from the web browser application. In some aspects, the user interface can be displayed as an overlay relative to the application. Alternatively or in addition, the user interface can be displayed as embedded (e.g., as an entry) in the application. User selection of the graphical component for installing the native application can be received. In response to receiving the user selection, an inline installation of the native application between the server and the system can be initiated. The system can refrain from re-directing to an installation page for the native application on the server.

Figure 3:
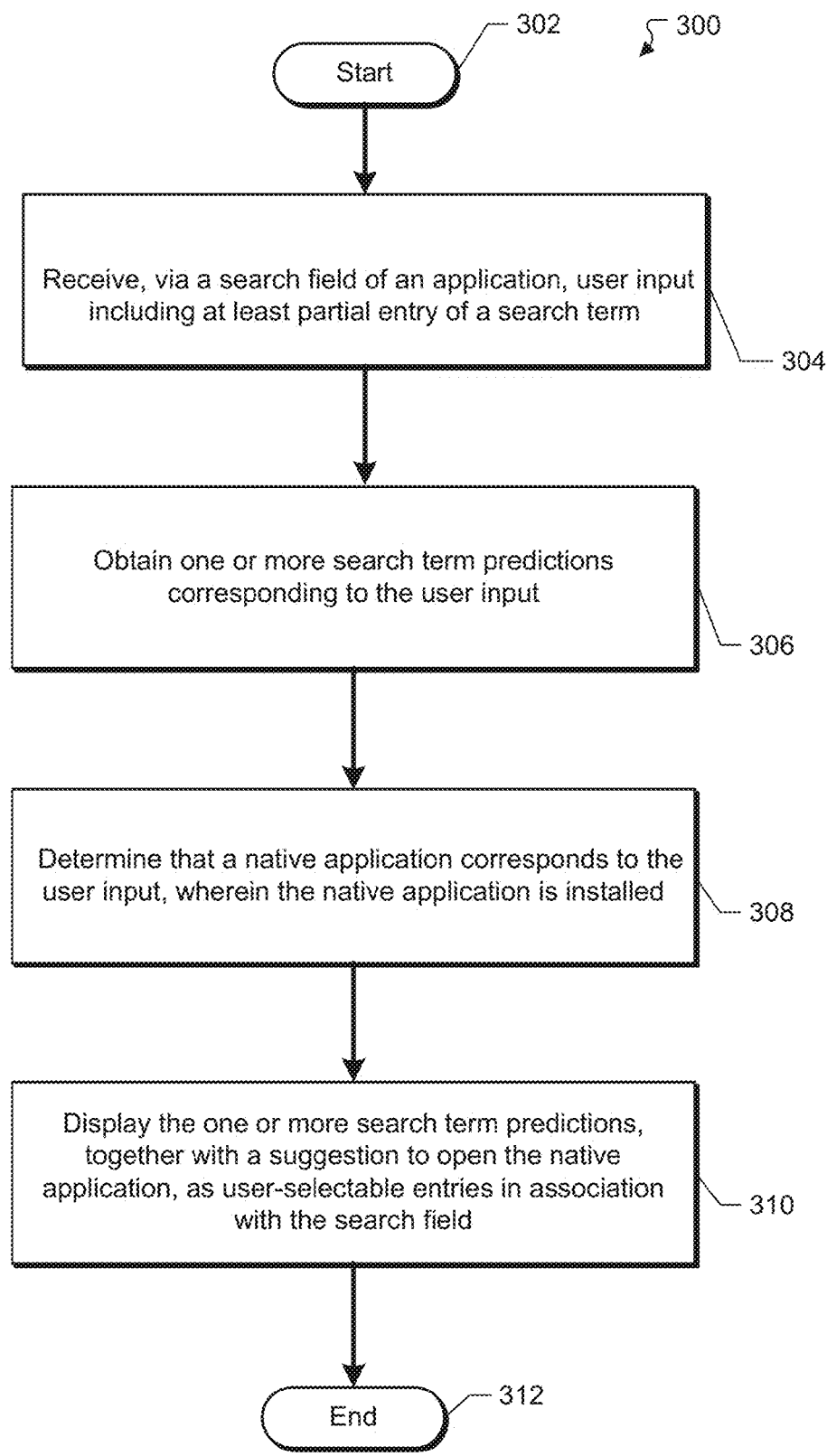
FIG. 3 illustrates a flow diagram of an example process for providing a suggestion to open a native application.

FIG. 3 illustrates a flow diagram of an example process for providing a suggestion to open a native application. Following start block 302, input is received from a user via a search field of an application running on a system at step 304. The application can be a web browser application. The application can be a search application (e.g., an application for accessing web content via a search field). In some aspects, the application may be a video application, a social networking application, an email application, a map application and/or similar applications running on the system.

The search field can be configured to receive user input for a web-based search, and the input includes at least partial entry of a search term. The search field can be included in an address bar of the application, the address bar enabling the user to enter a uniform resource location. In some aspects, the search field can be a search input field of the application, the search input field enabling the user to enter at least a portion of a search term to initiate web searches.

At step 306, one or more search term predictions are obtained corresponding to the user input. The one or more search term predictions may comprise one or more search term suggestions associated with the at least partial entry of the search term. For example, a search term suggestion as "weather" may correspond to the partial entry as "weath" received as the user input. Alternatively or in addition, the one or more search term predictions may comprise at least one uniform resource locator (URL) suggestion corresponding to the user input.

The one or more search term predictions can be obtained in different manners. For example, the one or more search term predictions can be associated with the user's prior search or browsing history, where prior search terms or URL's entered by a user are compared with current input received within the search field at step 304. The prior search or browsing history can be accessed from local storage (e.g., within a cache) or from remote storage (e.g., on a server in association with a user profile). Prior terms that match the current search term (or partial search term) can be listed as the one or more search term predictions.

In some aspects, the one or more search term predictions can be based on the cumulative search activities of other users. For example, the computing device (e.g., mobile device 104) may utilize a prediction service for automatically determining the one or more search term predictions based on the search term input by the user and publicly available data associated with the search activities of other users. The prediction service and the other users' search activities may be provided, for example, by a provider of a search engine (e.g., hosted by server 110) for performing web searches. Further, the predicted search queries may be algorithmically determined by the prediction service based on a number of objective factors (e.g., popularity of search terms) without any user intervention. The search data used by the prediction service may be updated frequently to provide up-to-date or relevant search queries.

The prediction service may be associated with an "autocomplete" feature of the application that attempts to predict search queries of interest to the user (e.g., the search string being input by the user) based on the search history of the user and other users. The user may be able to enable or disable the application's use of such a prediction service via, for example, a user setting or configuration panel of the application. As noted above, the search term being input by the user may be a portion (e.g., one or more characters) of a search string. As the user inputs each character of the search string, the one or more search term predictions may be displayed in real time within the application. The computing device may be further configured to dynamically update in real time the entries being displayed within the drop-down list based on the additional suggestions as predicted by the prediction service.

Upon the user selecting a search term prediction listed within the application, the computing device can query a search engine (e.g., hosted by server 110) with the term corresponding to the selected search term prediction. The search engine can perform a search based on the term, and the user can be provided with search results at the computing device. Alternatively, or in addition, upon the user selecting a URL suggestion listed within the application, the computing device can be directed to the web page corresponding to the selected URL.

At step 308, a determination is made that a native application corresponds to the user input and the native application is installed on the system.

In some aspects, as noted in step 306, at least one URL may correspond to the user input. Determining that a native application corresponds to the user input may comprise identifying, from among plural native applications on the system, a native application as being configured to handle the at least one URL. The identifying may comprise filtering out web browser applications that can handle the at least one URL. For example, a first search may be executed by an operating system for applications excluding any web browser application that can handle HTTP intent. A second search may be executed by the operating system for applications including web browser applications and native applications that can handle the at least one URL corresponding to the user input (e.g., http://xyz.com). By comparing the search results from the first search and the second search, a native application other than web browser applications can be identified to handle the at least one URL. The determination may be made by an operating system API on the system.

In some implementations, determining that a native application corresponds to the user input may be based on one or more matches between the at least partial entry of a search term included in the user input and meta information associated with a native application. The one or more matches may be determined by comparing one or more characters of the search string and meta information associated with a native application. Meta information of the native application may include, for example, the name of the native application and/or the description of the application. In example aspects, meta information of the native application can be retrieved by an application programming interface (API) of a digital distribution platform for applications.

At step 310, the one or more search term predictions, together with a suggestion to open the native application are displayed within the application, as user-selectable entries in association with the search field. In some aspects, user selection of the suggestion to open the native application may be received. In addition, in response to receiving the user selection, the native application may be opened.

Figure 4A:
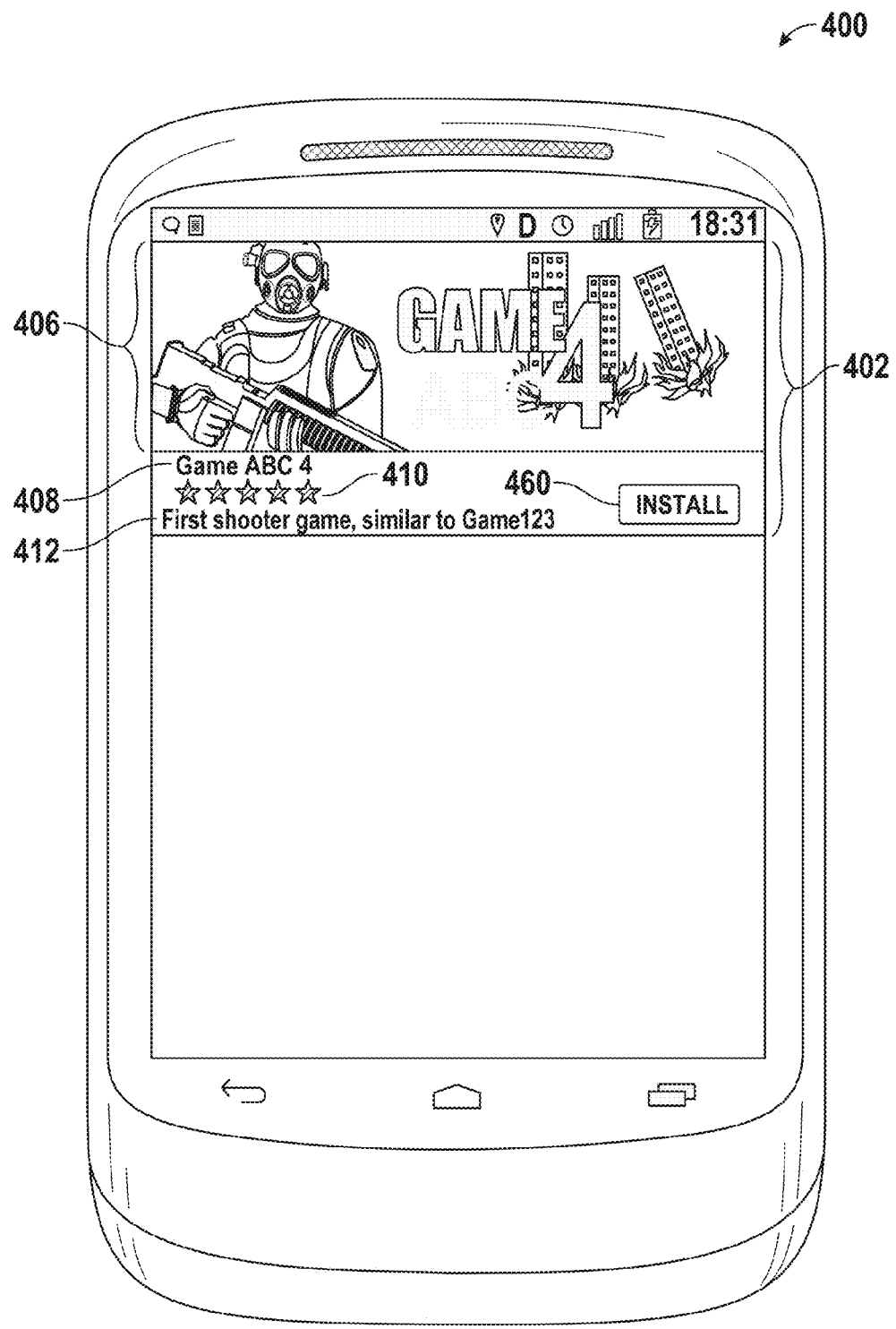
FIGS. 4A-4B illustrate example user interfaces of a native application installation suggestion.
Figure 4B:
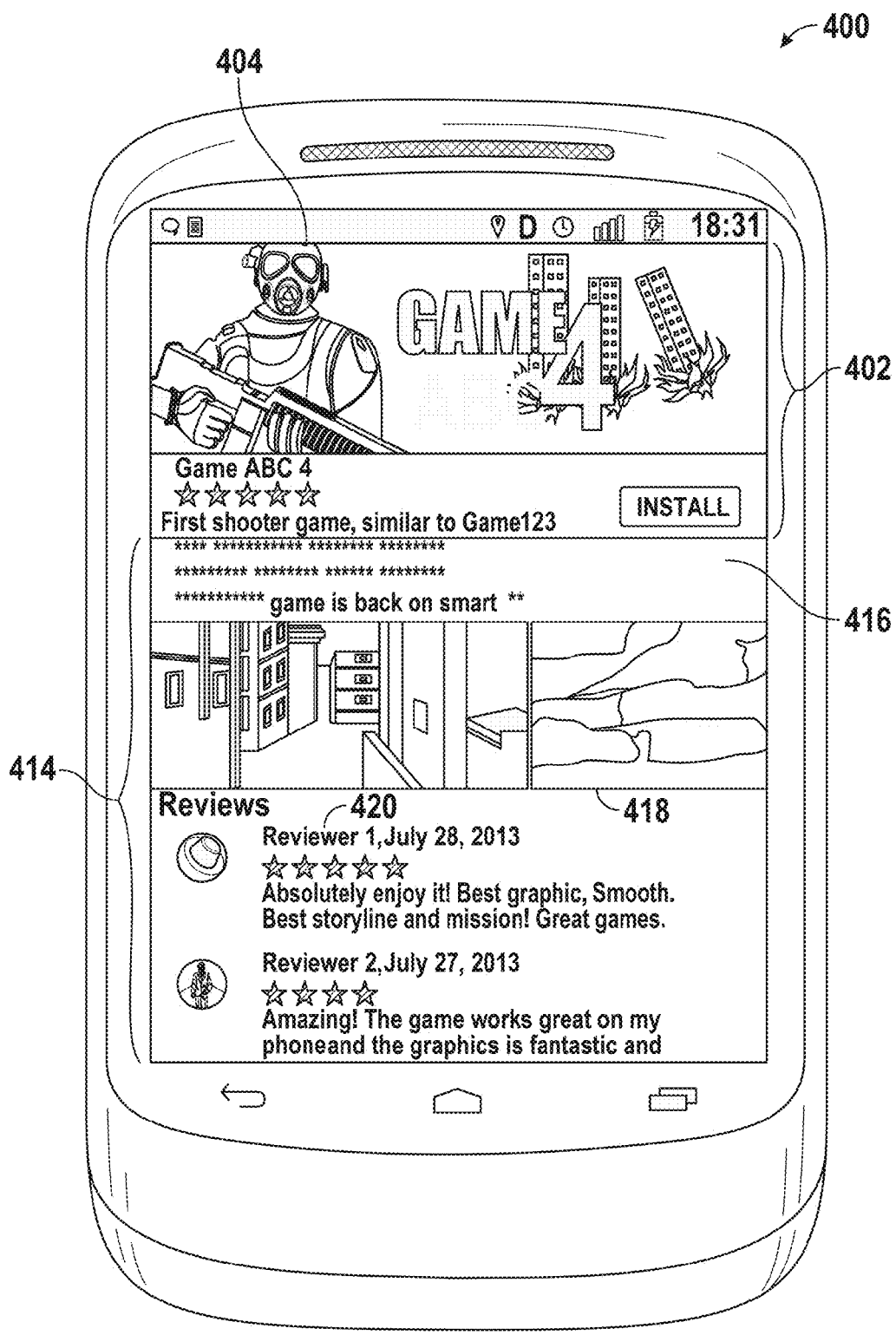

FIG. 4 illustrates an example user interface of a native application installation suggestion. For example, user interface 400 may be provided to suggest a native application installation on a computing device (e.g., computer device 104 of FIG. 1, as described above). User interface 400 may be provided in association with a server (e.g., server 110 of FIG. 1, as described above) that can be a digital distribution platform for native applications. However, user interface 400 is not limited thereto. In some aspects, user interface 400 may be displayed as a suggestion interface 402 in FIG. 4A. Alternatively, user interface 400 may be displayed as suggestion interface 404 in FIG. 4B. Suggestion interface 402 may be expanded to display as suggestion interface 404 upon user interaction with suggestion interface 402. User interaction with suggestion interface 402 may include tapping on (e.g., via touch input or stylus input), clicking (e.g., via mouse), scrolling, and/or touching suggestion interface 402 without activating the installation process (e.g., an install button).

Suggestion interface 402 includes an illustration area 406, a name area 408, a ratings area 410, a recommendation area 412 and an install button 460. Illustration area 406 may include, for example, an icon of the suggested native application, provided by the native application developer. An overall ranking of the suggested native application may be displayed in ratings area 410. The ranking indicator in the example of FIGS. 4A-AB is illustrated as a star system, but various other ranking indications may be presented. One or more reasons for suggesting the native application may be displayed in recommendation area 412. The one or more reasons may be determined by the one or more social annotations, as discussed in step 208 of FIG. 2. Install button 460 may display, for example, a price tag (e.g., $2.99) if the native application suggested is not free. The user may initiate an installation process of the native application suggested using install button 460, as will be described in greater detail below with reference to FIGS. 5A-5D and FIGS. 6A-6D. Information displayed in suggestion interface 402 (e.g., illustration, name, ratings, and reasons and price of the native application suggested) may be identified according to step 208 of FIG. 2.

In the example of FIG. 4A, "GAME ABC 4" is displayed as the name of the native application suggested with five star ratings and "First shooter game, similar to GAME A" as reasons for recommendation.

Suggestion interface 404 includes an information area 414 and suggestion interface 402 as described above. Information area 414 may include a description area 416, an image area 418, and a review area 420. Description area 416 may include descriptions, for example, to characterize the native application suggested. Image area 418 may include, for example, one or more screenshots of the native application suggested. Review area 420 may include one or more reviews from one or more reviewers that have used the native application suggested.

FIG. 5 illustrates an example user interface of a web browser running on a mobile device, where the user interface includes a suggestion to install a native application. For example, user interface 500 may be provided in an implementation of a web browser for a mobile device (e.g., computing device 104 of FIG. 1, as described above). User interface 500 may be provided in association with a server (e.g., server 110 of FIG. 1, as described above) that can be a digital distribution platform for native applications. However, user interface 500 is not limited thereto. In addition, while the example of FIG. 5 is described with reference to a web browser, the subject disclosure is not limited thereto, and can apply to other applications which include a search field for initiating a search (e.g., a web-based search).

User interface 500 includes an address bar 510 that enables a user at the computing device to enter a location address (e.g., URL) corresponding to a web page to be loaded within the browser. Address bar 510 includes an input box 511 for user input. For example, the user may enter the location address of a particular web page using one or more user input devices of the computing device. Alternatively or in addition, input box 511 may also function as a search field. Thus, in addition to inputting web addresses for navigating to web pages, the user may initiate web searches based on at least a portion of a search term entered by the user into input box 511.

Web page content or data loaded within the browser (e.g., within a cache of the browser) may be displayed in a content area 512. Content displayed in content area 512 may be associated with the user input in address bar 510. The user may interact with the content displayed in content area 512 using one or more user input devices of the mobile device (e.g., a touchscreen) to select inside the field and/or entering text characters. User interface 500 may include various other user control elements including, for example, navigation controls for the user to navigate between different web pages to be loaded and displayed within content area 512.

Figure 5A:
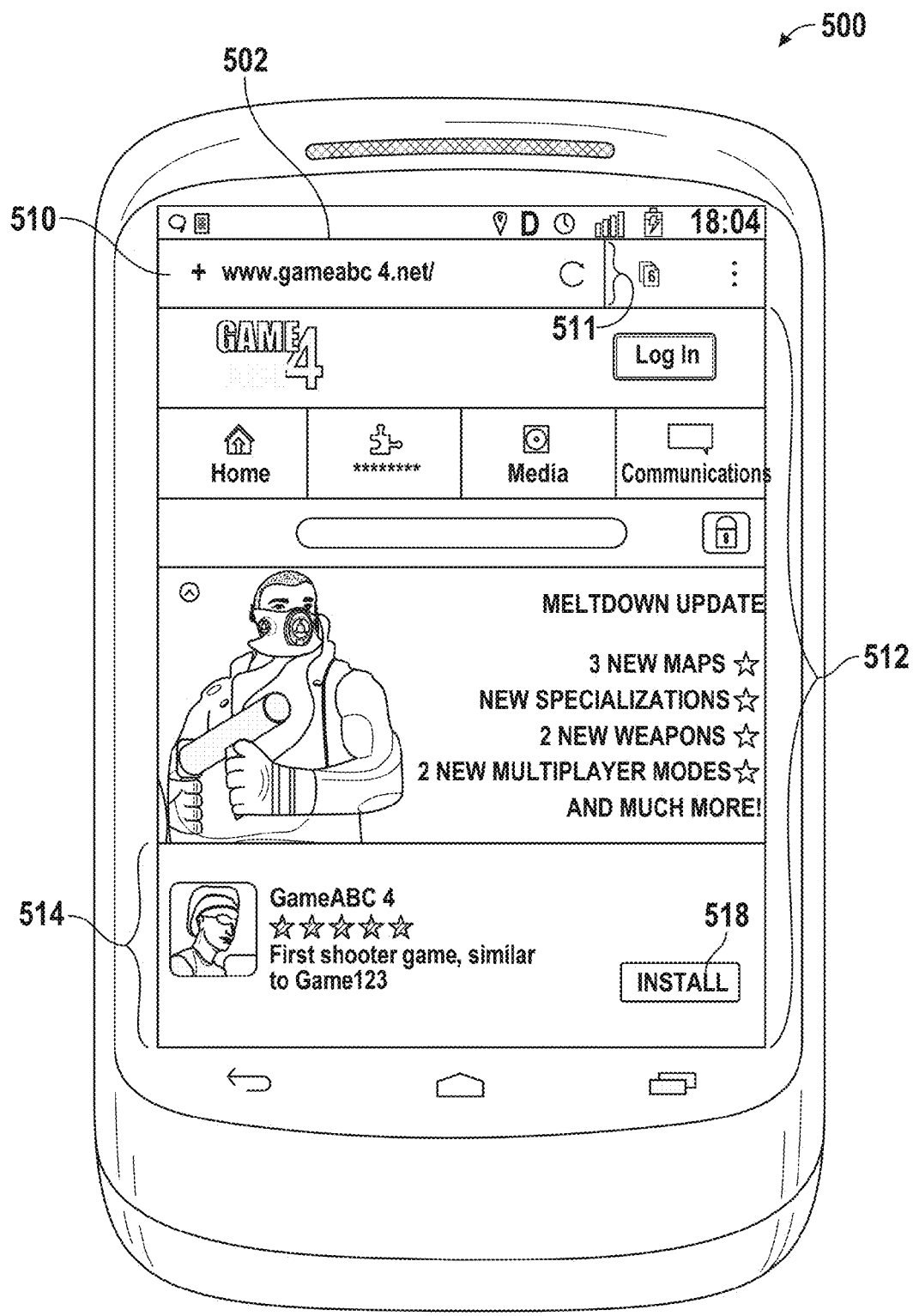
FIGS. 5A-5D illustrate example user interfaces of a web browser running on a mobile device, where the user interfaces include a suggestion to install a native application.

FIG. 5A illustrates an example user interface of a web browser running on a mobile device, where the user interface includes a native application installation suggestion.

User interface 502 includes address bar 510, input box 511, content area 512 and a suggestion interface 514. Based on the URL or the at least a portion of a search term in input box 511, a native application may be suggested to the user according to the process described in FIG. 2. Suggestion interface 514 corresponds to user interface 400 of FIG. 4. Suggestion interface 514 includes an install button 518, which may correspond to install button 460 as described in FIG. 4. Suggestion interface 514 may be displayed as an overlay on content area 512. In some aspects, suggestion interface 514 may be displayed as embedded in content area 512. Suggestion interface 514 may be displayed at any location within user interface 502.

In the example of FIG. 5A, "www.gameabc.net" is provided within input box 511 and a suggestion to install a native application of "GAME ABC 4" is displayed in suggestion interface 514.

Figure 5B:
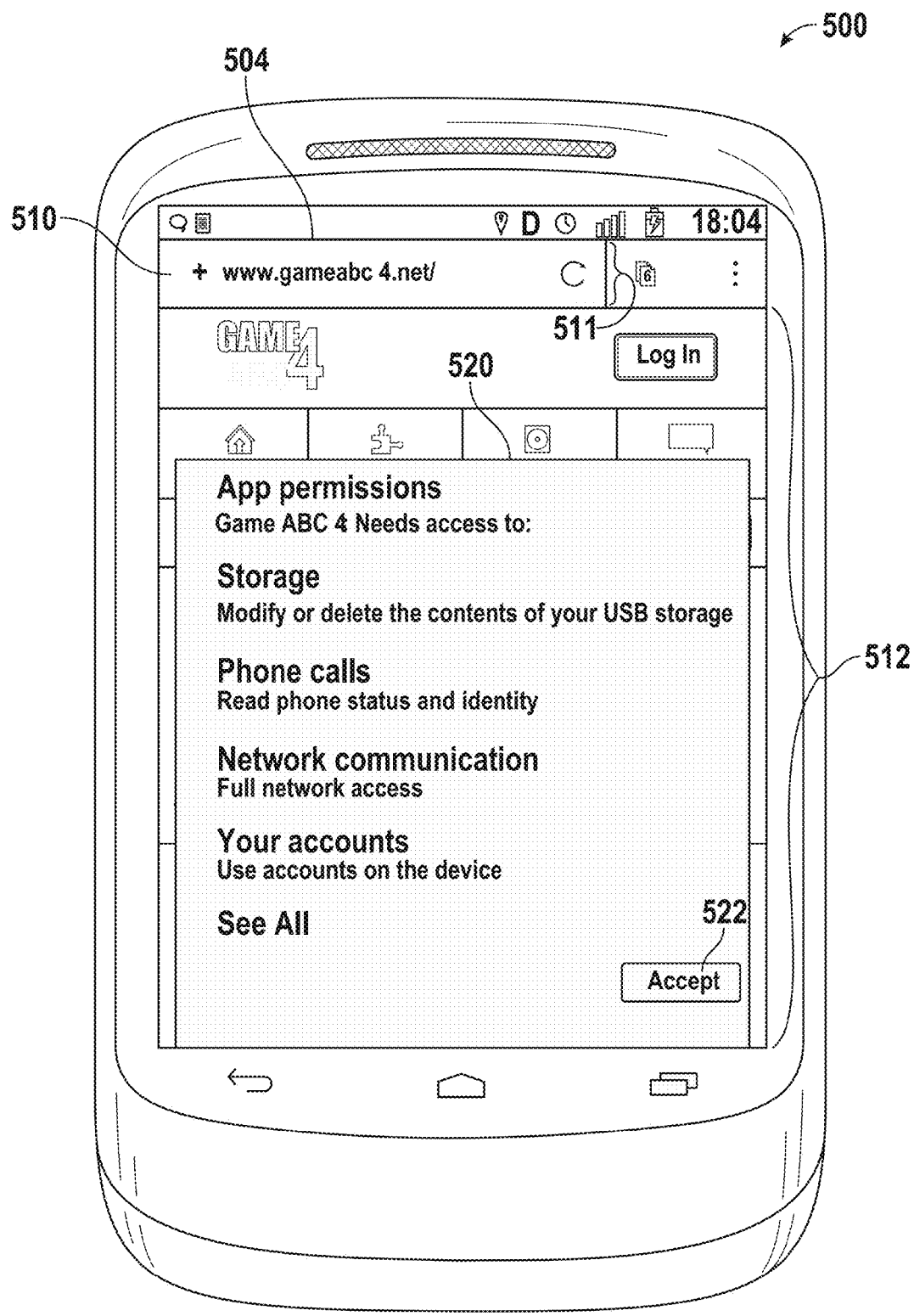

FIG. 5B illustrates an example user interface of a web browser running on a mobile device, where the user interface includes an application permissions dialog. Upon receiving user's selection to install the native application suggested (e.g., tap on install button 518 in FIG. 5A), user interface 504 is displayed. User interface 504 includes address bar 510, input box 511, content area 512 and an application permissions dialog field 520. Address bar 510, input box 511, and/or content area 512 may not be selectable (e.g., shown in the background). Application permissions dialog field 520 may display permissions to access one or more information on the mobile device (e.g., storage, phone calls, network communication and/or the user's account). Application permissions dialog field 520 may be displayed as an overlay on content area 512. Application permissions dialog field 520 may be displayed at any location within user interface 504. The user may accept the application permissions by selecting an accept button 522 (e.g., tap on accept button 522).

Figure 5C:
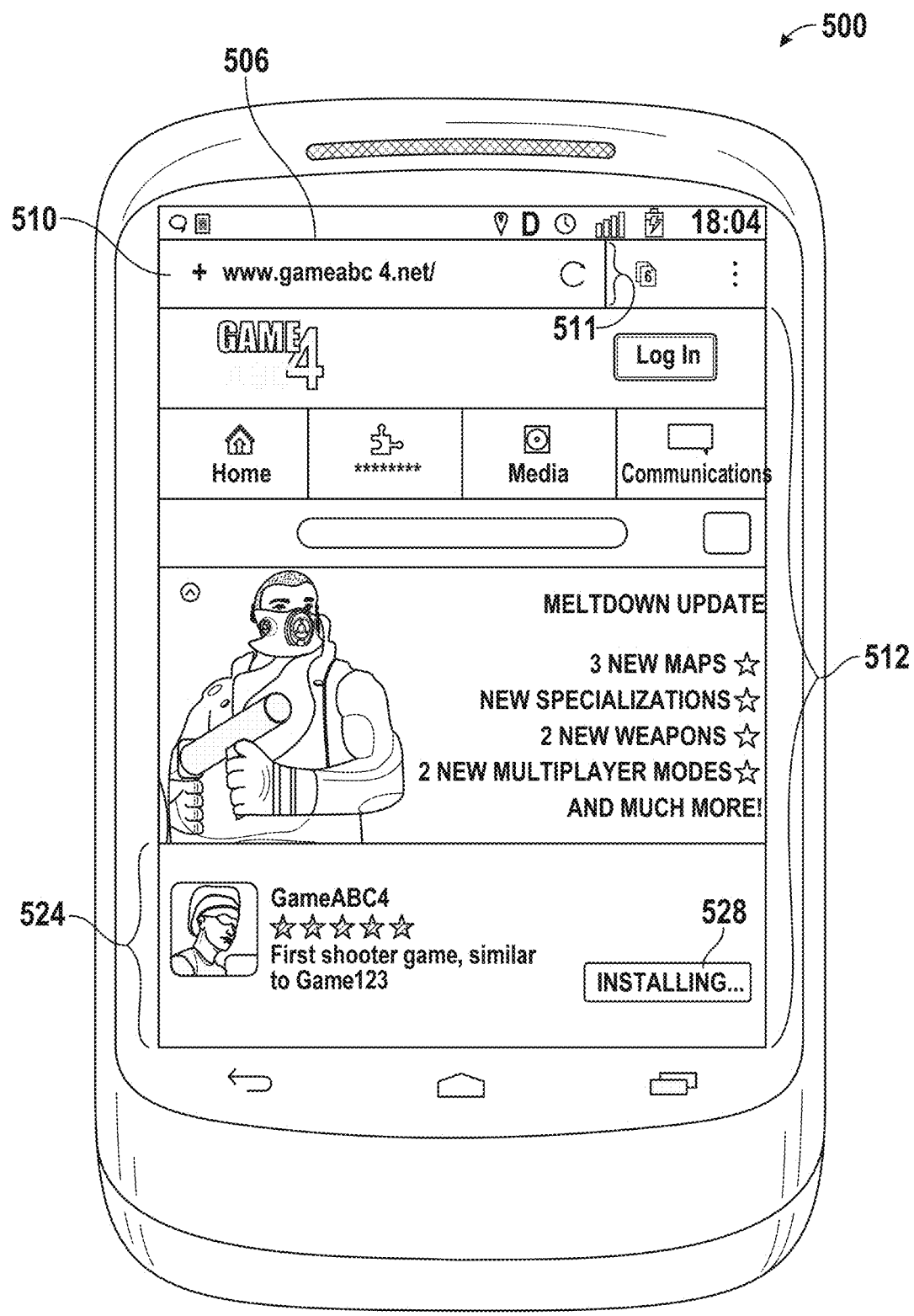

FIG. 5C illustrates an example user interface of a web browser running on a mobile device, where the user interface includes a native application installation status. Upon receiving user's selection to accept the application permissions as described in FIG. 5B, user interface 506 is displayed. User interface 506 includes address bar 510, input box 511, content area 512 and a status interface 524. Status interface 524 corresponds to suggestion interface 514 with install button 518 displaying as a status area 528. Installation status may be displayed as, for example, "INSTALLING . . . " in status area 528. Status interface 524 may be displayed as an overlay on content area 512. Status interface 524 may be displayed at any location within user interface 506.

Figure 5D:
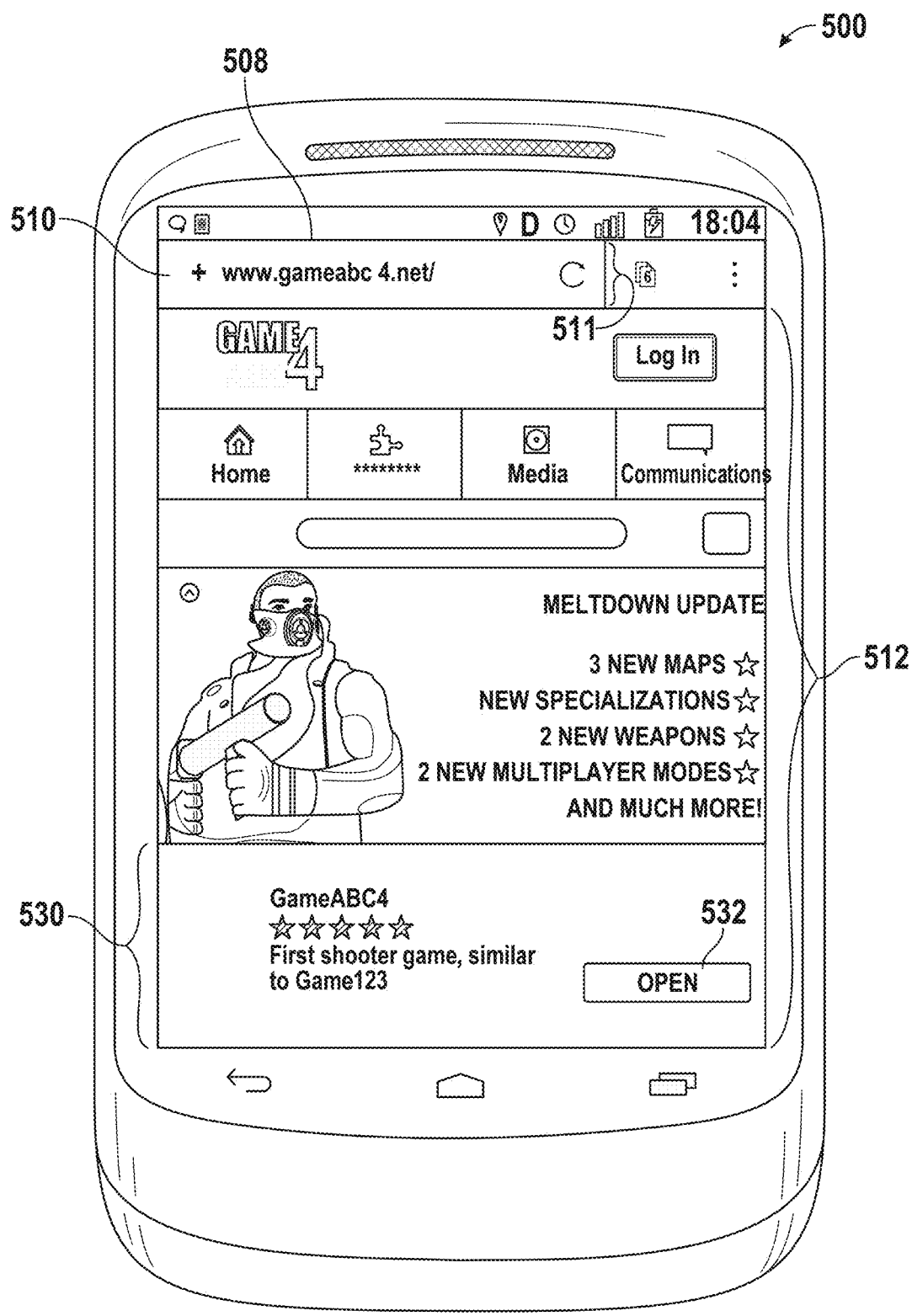

FIG. 5D illustrates an example user interface of a web browser running on a mobile device, where the user interface includes a suggestion to open a native application. Upon finishing installation of the native application suggested, user interface 508 is displayed. User interface 508 includes address bar 510, input box 511, content area 512 and a suggestion interface 530. Suggestion interface 530 corresponds to suggestion interface 514 with install button 518 displaying as an open button 532. Suggestion interface 530 may be displayed as an overlay on content area 512. Suggestion interface 530 may be displayed at any location within user interface 508. The user may select open button 532 to open the native application suggested.

FIG. 6 illustrates an example user interface of a search application running on a mobile device, where the user interface includes a suggestion to install a native application. For example, user interface 600 may be provided in an implementation of a search application for a mobile device (e.g., computing device 104 of FIG. 1, as described above). User interface 600 may be provided in association with a server (e.g., server 110 of FIG. 1, as described above) that can be a digital distribution platform for native applications. However, user interface 600 is not limited thereto. In addition, while the example of FIG. 6 is described with reference to a search application, the subject disclosure is not limited thereto, and can apply to other applications which include a search field for initiating a search (e.g., a web-based search).

User interface 600 includes a search field 610 that enables a user at the computing device to enter at least partial entry of a search term and/or URL. Search field 610 includes an input box 611 for user input. The user may initiate web searches based on the at least partial entry of a search term entered by the user into input box 611.

Data loaded within the search application may be displayed in a content area 612. Content area 612 may include one or more user-selectable entries including, for example, images, URL, videos, and/or one or more native application installation suggestions. The user may interact with the content displayed in content area 612 using one or more user input devices of the mobile device (e.g., a touchscreen) to select inside the field.

Figure 6A:
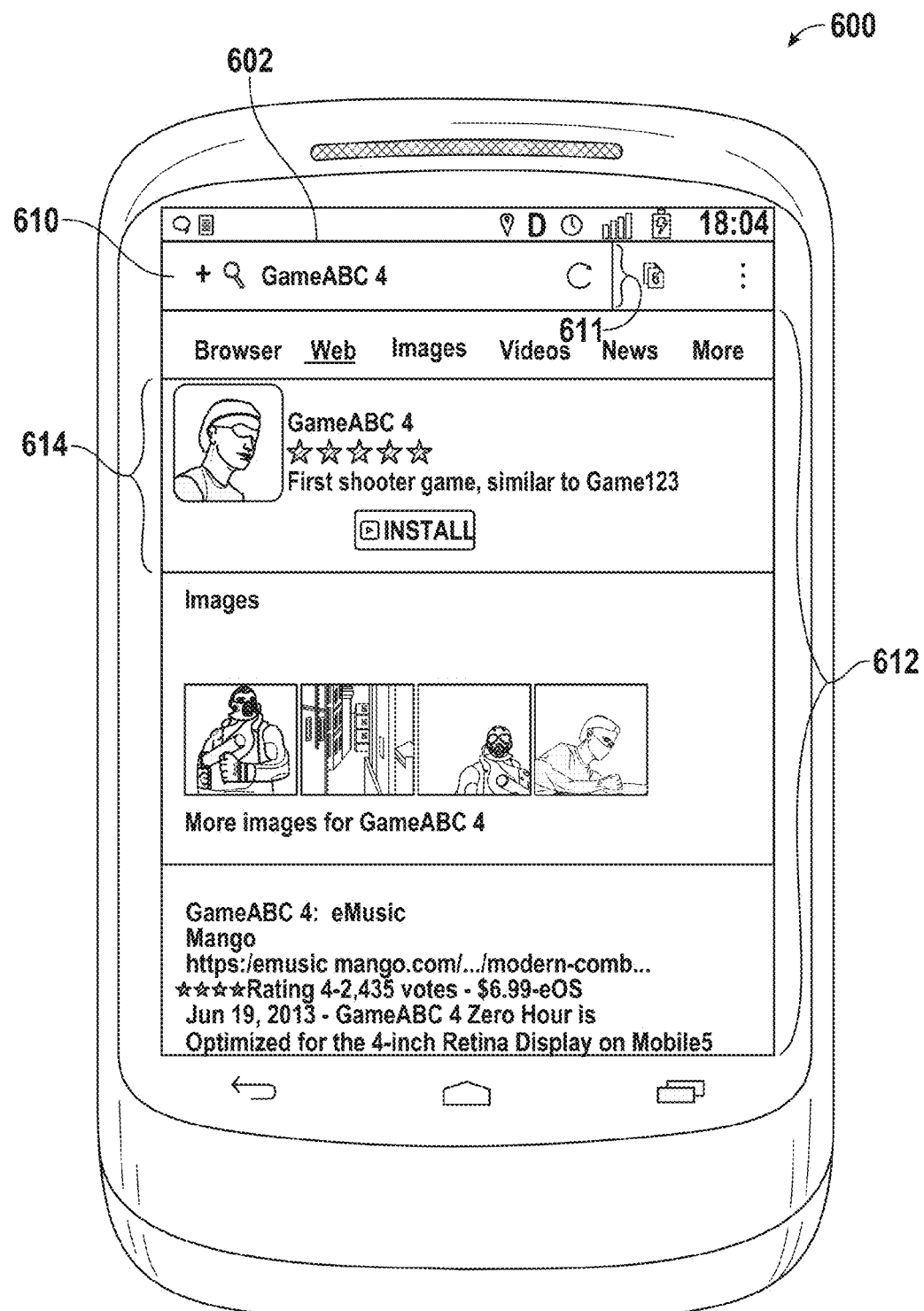
FIGS. 6A-6D illustrate example user interfaces of a search application running on a mobile device, where the user interfaces include a suggestion to install a native application.

FIG. 6A illustrates an example user interface of a search application running on a mobile device, where the user interface includes a native application installation suggestion.

User interface 602 includes search field 610, input box 611, content area 612 and a suggestion interface 614. Based on the at least partial entry of the search term in input box 611, a native application may be suggested to the user according to the process described in FIG. 2. Suggestion interface 614 corresponds to suggestion interface 514 of FIG. 5A. Suggestion interface 614 may be displayed as an entry of the search results that is embedded in content area 612. Suggestion interface 614 may be displayed at any location within user interface 602. In the example of FIG. 6A, "GAME ABC" is provided by the user within input box 611 and a suggestion to install a native application of "GAME ABC 4" is displayed in suggestion interface 614.

Figure 6B:
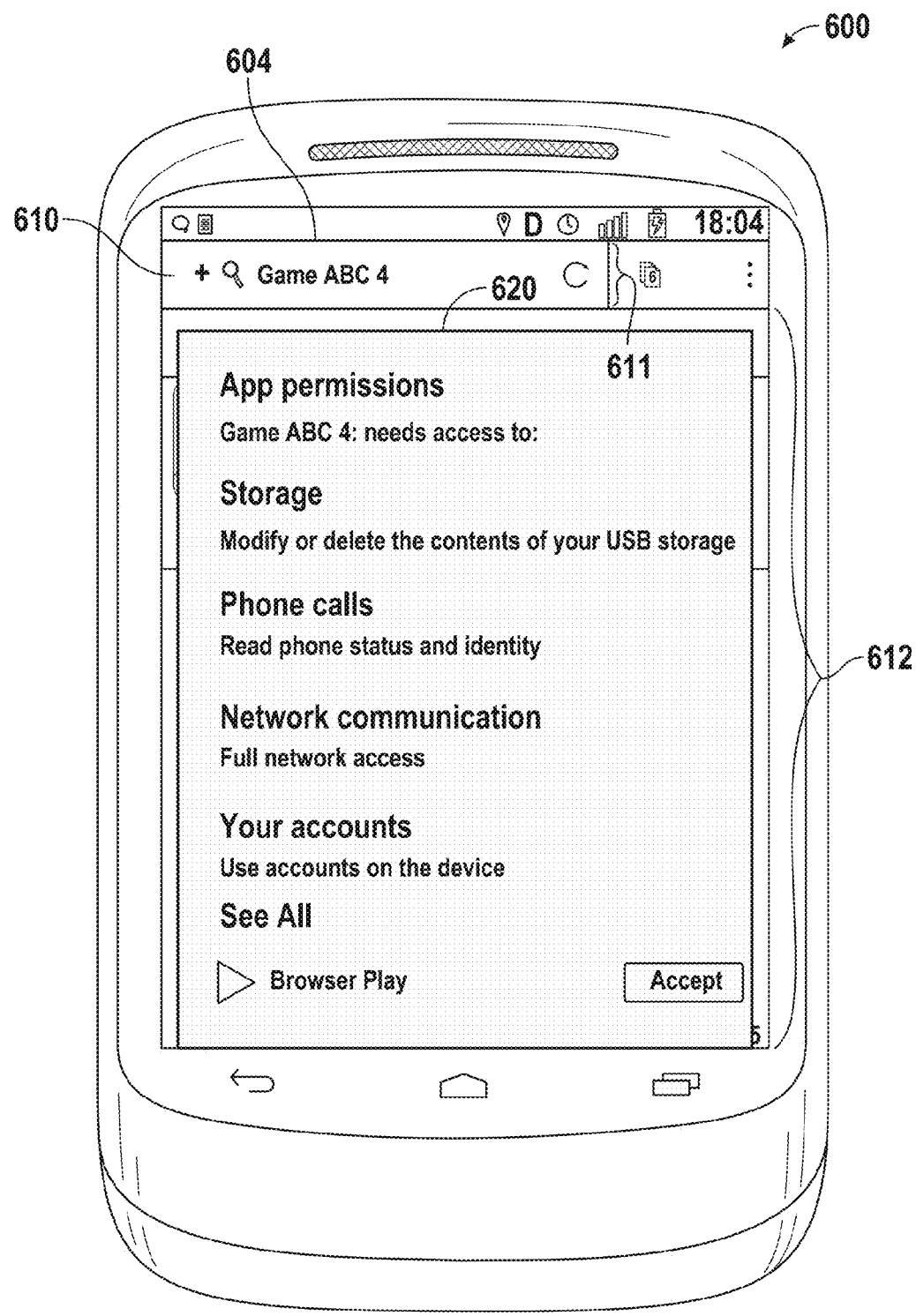

FIG. 6B illustrates an example user interface of a search application running on a mobile device, where the user interface includes an application permissions dialog. Upon receiving user's selection to install the native application suggested (e.g., tap on an install button in FIG. 6A), user interface 604 is displayed. User interface 604 includes search field 610, input box 611, content area 612 and an application permissions dialog field 620. Application permissions dialog field 620 may correspond to application permissions dialog field 520 of FIG. 5B. Search field 610, input box 611 and/or content area 612 may not be selectable (e.g., shown in the background). Application permissions dialog field 620 may be displayed as an overlay on content area 612. Application permissions dialog field 620 may be displayed at any location within user interface 604. User may accept the application permissions by selecting an accept button in application permissions dialog field 620.

Figure 6C:
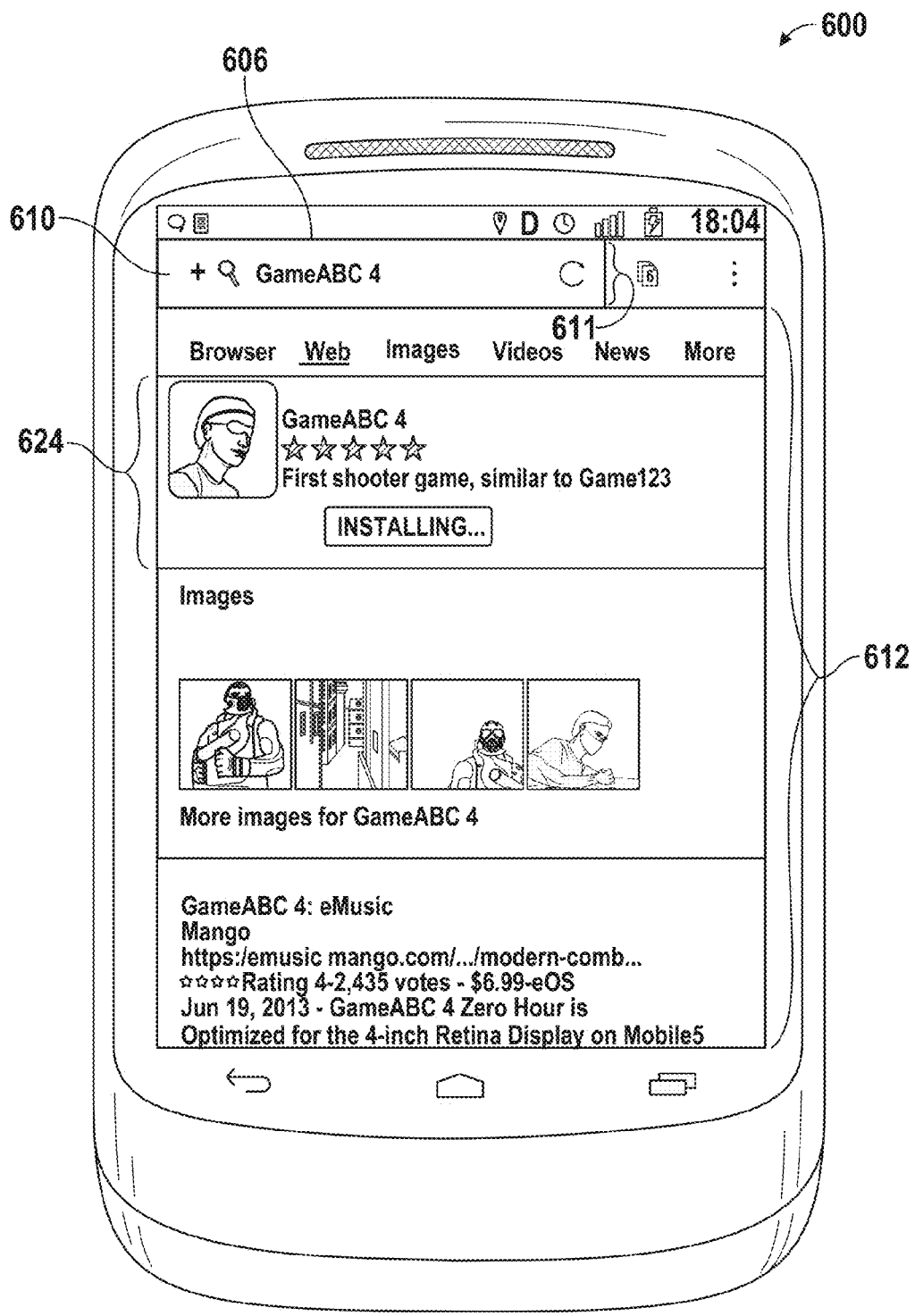

FIG. 6C illustrates an example user interface of a search application running on a mobile device, where the user interface includes a native application installation status. Upon receiving user's selection to accept the application permissions as described in FIG. 6B, user interface 606 is displayed. User interface 606 includes search field 610, input box 611, content area 612 and a status interface 624. Status interface 624 corresponds to status interface 524 as described in FIG. 5. Status interface 624 may be displayed as an entry of the search results that is embedded in content area 612. Status interface 624 may be displayed at any location within user interface 606.

Figure 6D:
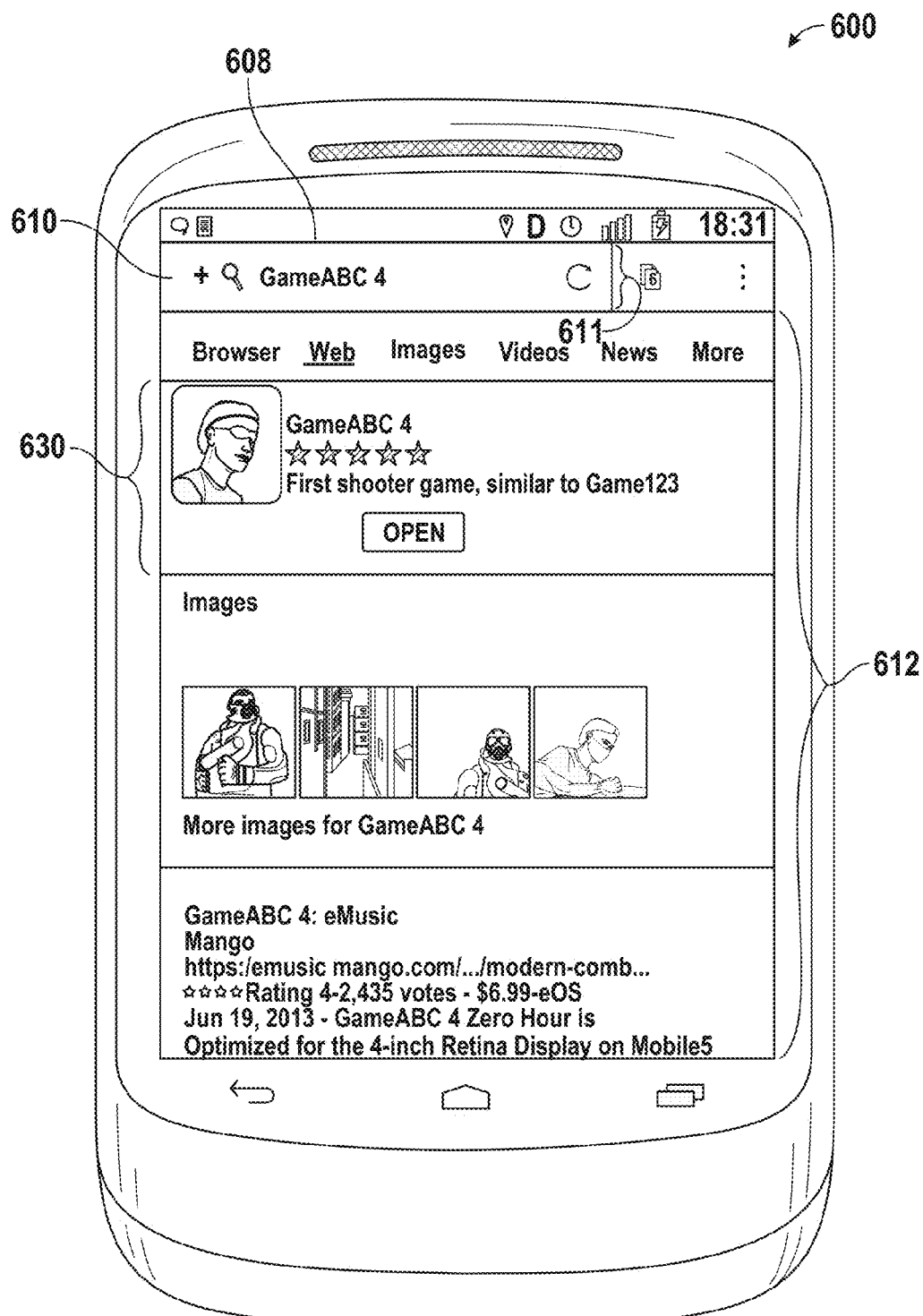

FIG. 6D illustrates an example user interface of a search application running on a mobile device, where the user interface includes a suggestion to open a native application. Upon finishing installation of the native application suggested, user interface 608 is displayed. User interface 608 includes search field 610, input box 611, content area 612 and a suggestion interface 630. Suggestion interface 630 corresponds to suggestion interface 530 as described in FIG. 5. Suggestion interface 630 may be displayed as an entry of search the results that is embedded in content area 612. Suggestion interface 630 may be displayed at any location within user interface 608. User may open the native application suggested by selecting an open button in suggestion interface 630.

FIG. 7 illustrates an example user interface of a video application running on a mobile device, where the user interface includes a suggestion to install a native application. For example, user interface 700 may be provided in an implementation of a video application for a mobile device (e.g., computing device 104 of FIG. 1, as described above). User interface 700 may be provided in association with a server (e.g., server 110 of FIG. 1, as described above) that can be a digital distribution platform for native applications. However, user interface 700 is not limited thereto. In addition, while the example of FIG. 7 is described with reference to a video application, the subject disclosure is not limited thereto, and can apply to other applications that can process a video content (e.g., record, share, find and/or watch videos).

User interface 700 includes a video content area 708 and a content area 712. Content area 712 may include one or more user-selectable entries including, for example, images, URL, videos, and/or one or more native application installation suggestions. Video content 708 may include one or more video content. User may select and/or watch the video content displayed in video content area 708 using one or more user input devices of the mobile device (e.g., a touchscreen).

Figure 7A:
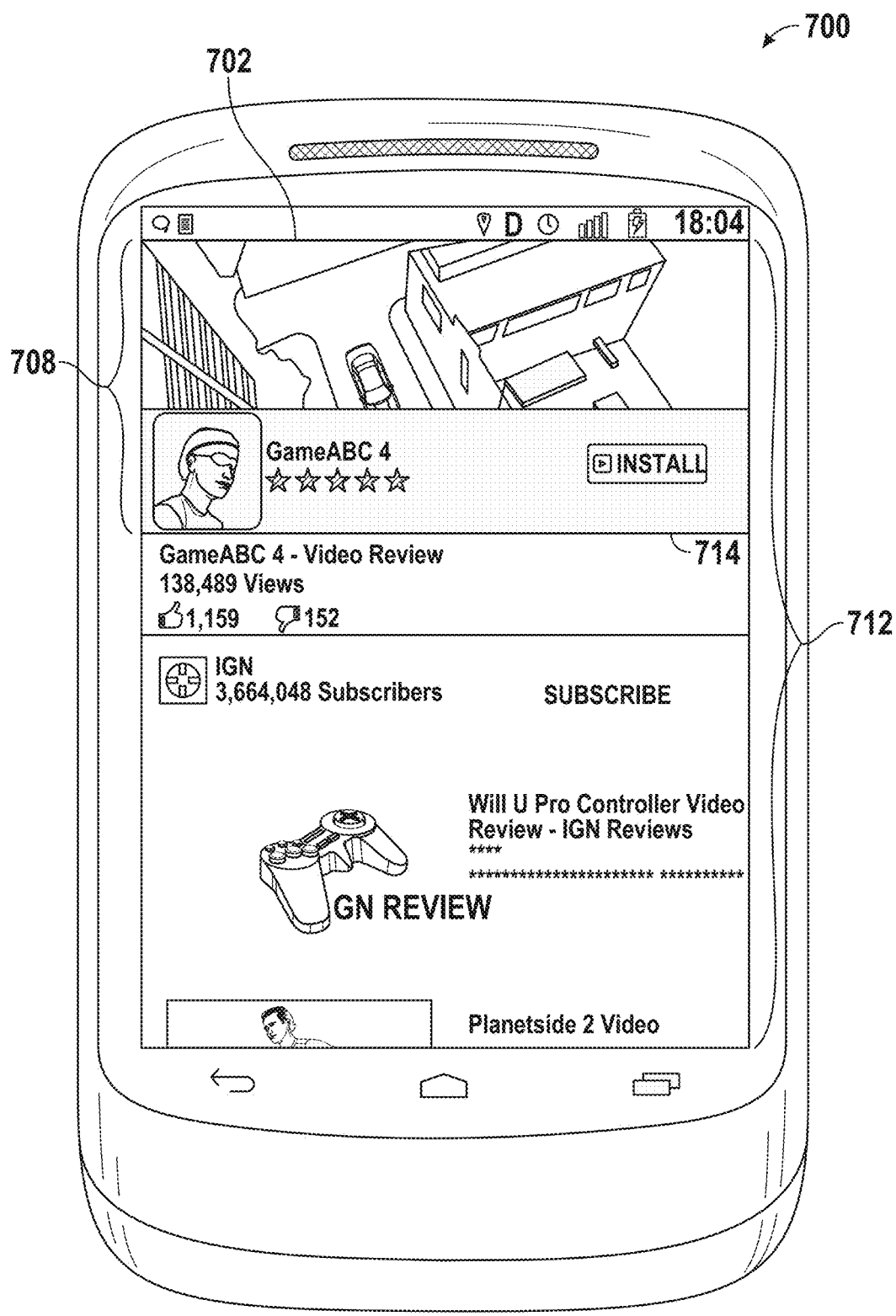
FIGS. 7A-7C illustrate example user interfaces of a video application running on a mobile device, where the user interfaces include a suggestion to install a native application.

FIG. 7A illustrates an example user interface of a video application running on a mobile device, where the user interface includes a suggestion to install a native application. User interface 702 includes video content area 708, content area 712 and a suggestion interface 714. Suggestion interface 714 corresponds to suggestion interface 514 of FIG. 5. Suggestion interface 714 may be displayed at any location within user interface 702. Suggestion interface 714 may be displayed as an overlay on video content area 708. User may select an install button in suggestion interface 714 to install the native application suggested as described in FIGS. 5A-5D and FIGS. 6A-6D.

Figure 7B:
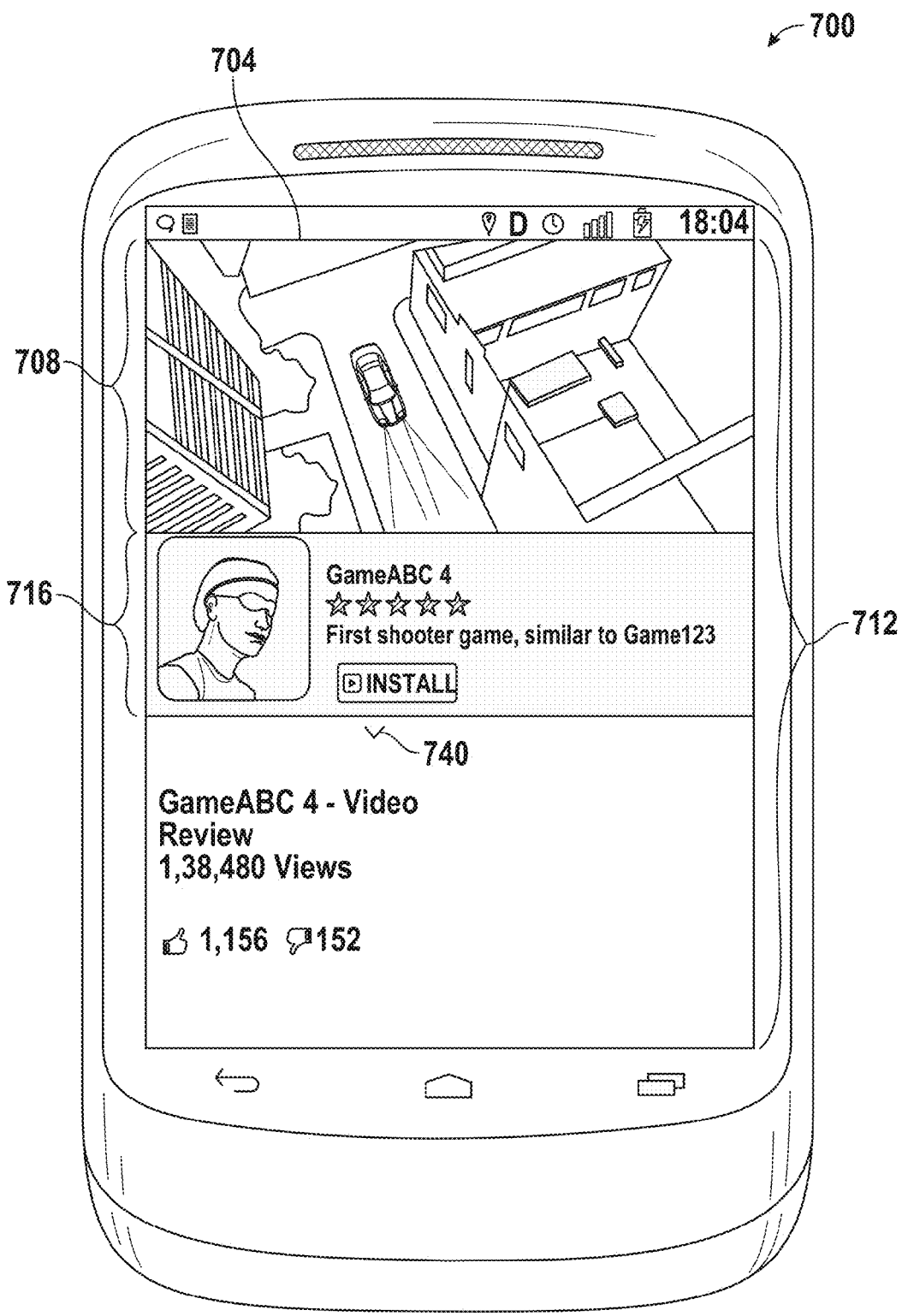

FIG. 7B illustrates an example user interface of a video application running on a mobile device, where the user interface includes a suggestion to install a native application. User interface 704 includes video content area 708, content area 712 and a suggestion interface 716 and a selection button 740. Suggestion interface 716 corresponds to suggestion interface 402 as described in FIG. 4. Suggestion interface 716 may be displayed as an entry that is embedded in user interface 704. Suggestion interface 716 may be displayed at any location within user interface 704. User may select selection button 740 to display user interface 706 as described in detail as below. User may select an install button in suggestion interface 716 to install the native application suggested as described in FIGS. 5A-5D and FIGS. 6A-6D.

Figure 7C:
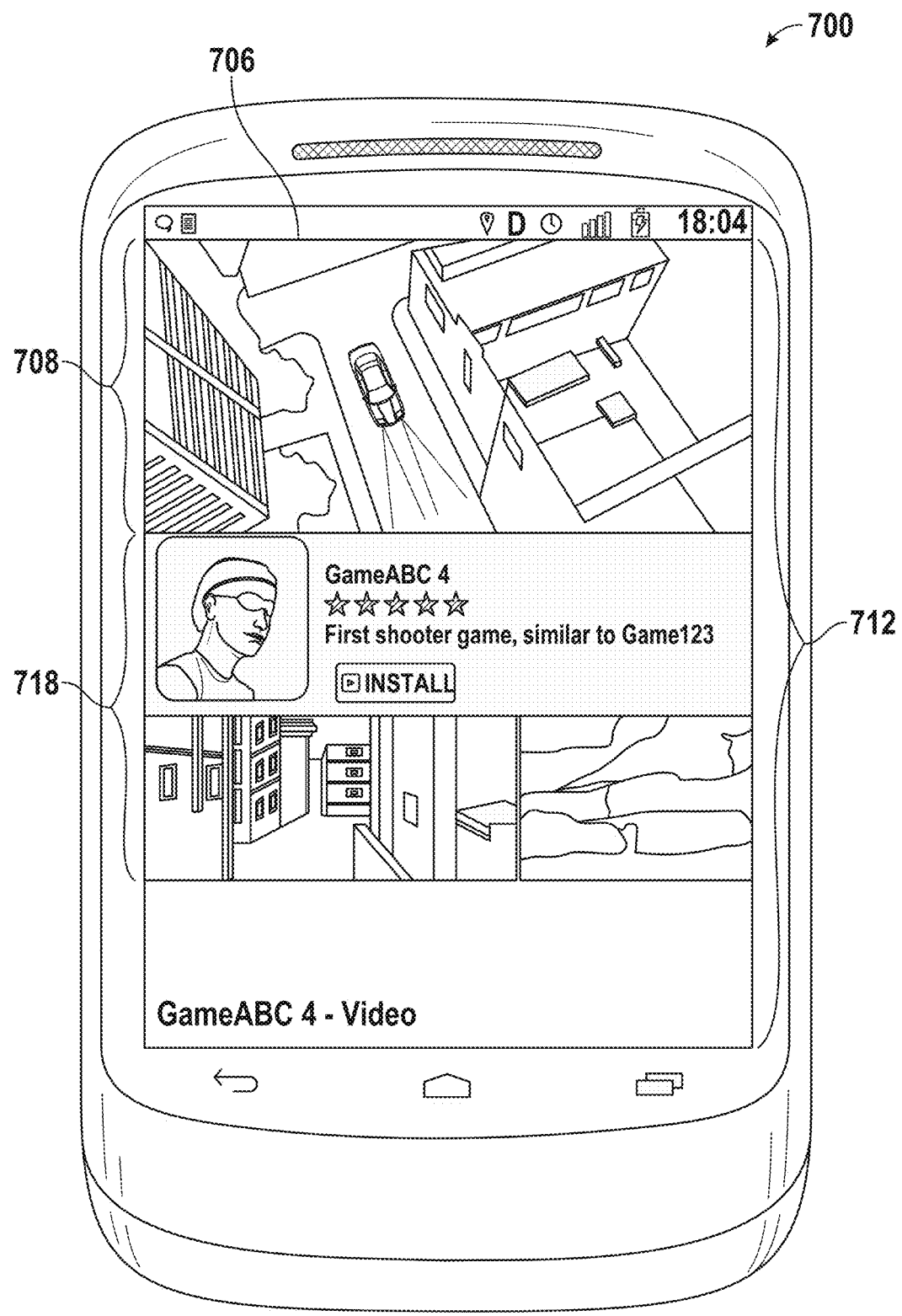

FIG. 7C illustrates an example user interface of a video application running on a mobile device, where the user interface includes a suggestion to install a native application. Upon user's selection on selection button 740 of FIG. 7B, user interface 706 is displayed. User interface 706 includes video content area 708, content area 712 and a suggestion interface 718. Suggestion interface 718 corresponds to suggestion interface 404 as described in FIG. 4. Suggestion interface 718 may be displayed as an entry that is embedded in user interface 706. Suggestion interface 718 may be displayed at any location within user interface 706. User may select an install button in suggestion interface 718 to install the native application suggested as described in FIGS. 5A-5D and FIGS. 6A-6D.

Figure 8:
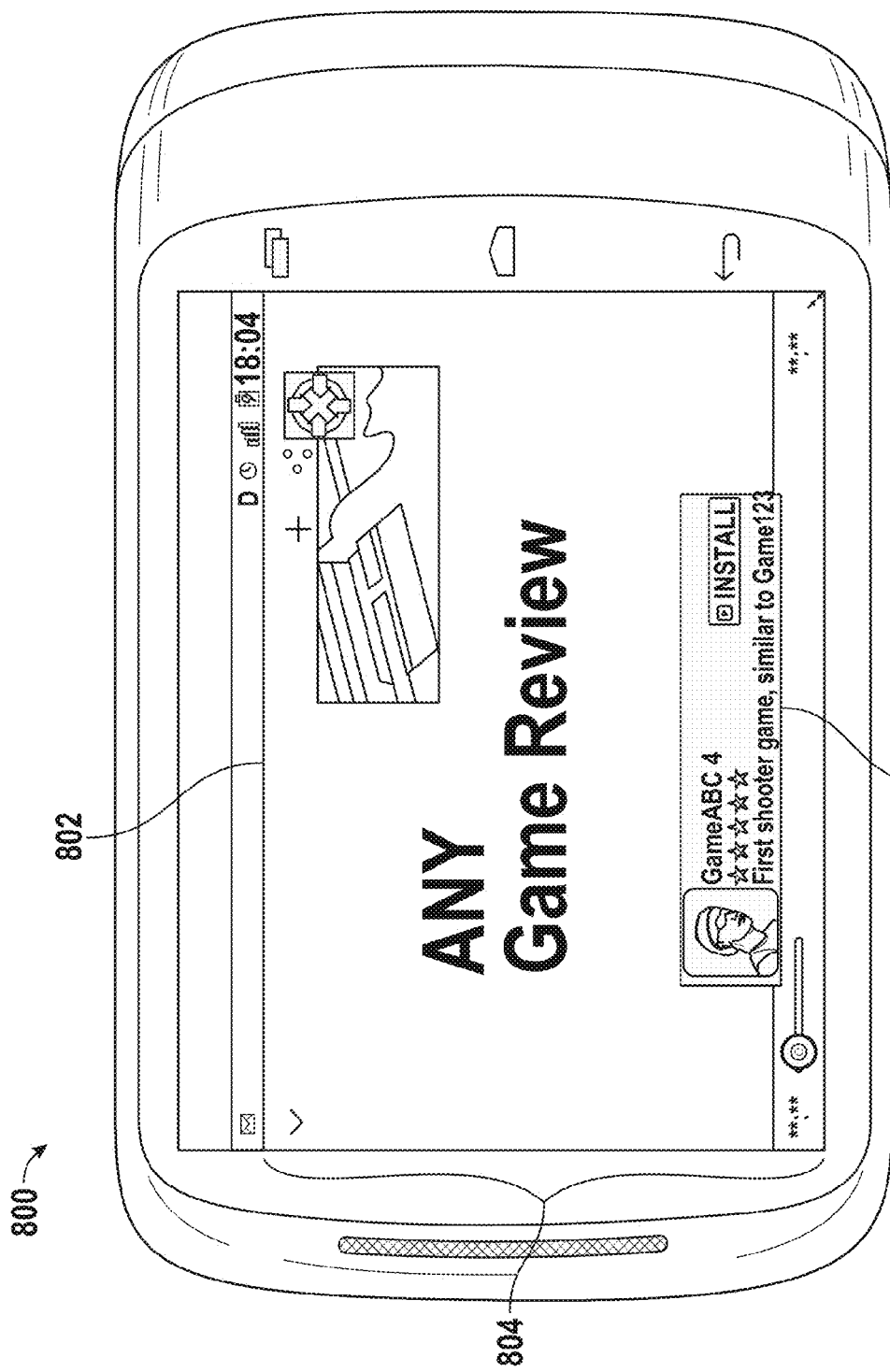
FIG. 8 illustrates an example user interface of a video application running on a mobile device, where the user interface includes a suggestion to install a native application.

FIG. 8 illustrates an example user interface of a video application running on a mobile device, where the user interface includes a suggestion to install a native application. For example, user interface 800 may be provided in an implementation of a video application for a mobile device (e.g., computing device 104 of FIG. 1, as described above). User interface 800 may be provided in association with a server (e.g., server 110 of FIG. 1, as described above) that can be a digital distribution platform for native applications. However, user interface 800 is not limited thereto. In addition, while the example of FIG. 8 is described with reference to a video application, the subject disclosure is not limited thereto, and can apply to other applications that can process a video content (e.g., record, share, find and/or watch videos).

User interface 802 includes a video content area 804 and a suggestion interface 814. A full screen video content may be displayed in video content area 804. User may select and/or watch the video content displayed in video content area 804 using one or more user input devices of the mobile device (e.g., a touchscreen). Suggestion interface 814 corresponds to suggestion interface 514 of FIG. 5. Suggestion interface 814 may be displayed at any location within user interface 802. Suggestion interface 814 may be displayed as an overlay on video content area 804. User may select an install button in suggestion interface 814 to install the native application suggested as described in FIGS. 5A-5D and FIGS. 6A-6D.

Figure 9:
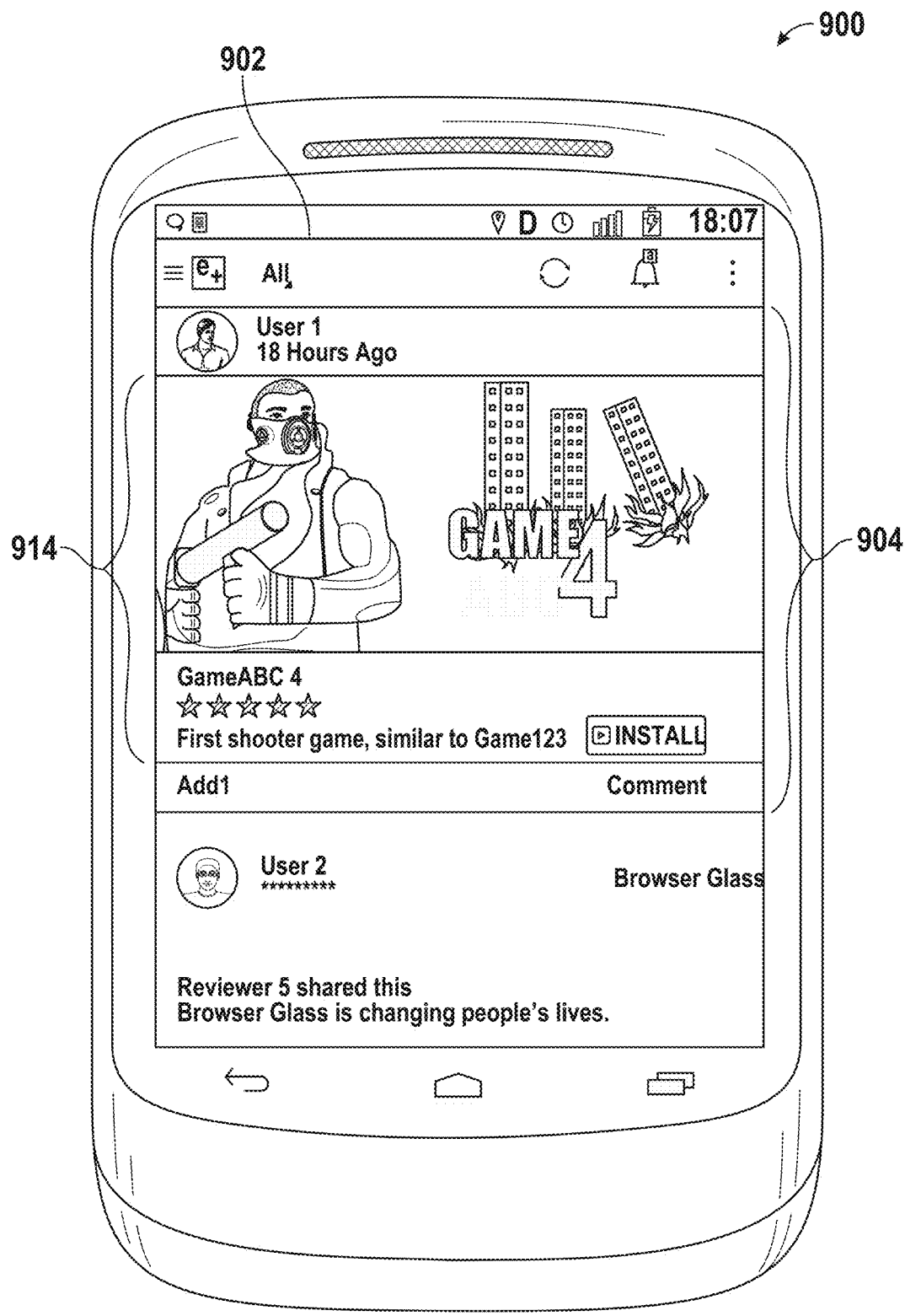
FIG. 9 illustrates an example user interface of a social networking application running on a mobile device, where the user interface includes a suggestion to install a native application.

FIG. 9 illustrates an example user interface of a social networking application running on a mobile device, where the user interface includes a suggestion to install a native application. For example, user interface 900 may be provided in an implementation of a social networking application for a mobile device (e.g., computing device 104 of FIG. 1, as described above). User interface 900 may be provided in association with a server (e.g., server 110 of FIG. 1, as described above) that can be a digital distribution platform for native applications. However, user interface 900 is not limited thereto. In addition, while the example of FIG. 9 is described with reference to a social networking application, the subject disclosure is not limited thereto, and can apply to other applications that can provide one or more social networking services.

Users of social networking services may create associations with one another. The phrase "social networking service" as used herein encompasses its plain and ordinary meaning, including, but not limited to, an online service, platform or site that focuses on building and reflecting of social associations among users. These associations may be stored within a social graph at each social networking service (e.g., maintained at remote server(s)). Such user associations may be defined on a user-to-user basis, or as a group of users associated through membership within a group. As used herein, a "post" generally refers to an item or document shared by one user ("post owner") with one or more other users of the social networking service. A post may include original content as well as preexisting content shared by the post owner. The post content may include text, images, video, audio, links, files, and/or other media.

Social networking services provide users with a set of posts for viewing as part of the user's social networking experience. The posts may include posts generated by other users, and shared with the user. Such posts may include private posts as well as public posts owned by contacts of the user and shared with the user. When users begin a session at a social networking service or otherwise requests to view a set of content at a social networking service (e.g., within a user stream or feed), a set of content items ("posts") is selected and provided for display to the user. The set of posts may include various content posted to the social networking service (or other associated social networking services and/or other services) and being shared with or visible to the user.

User interface 902 includes a post field 904 and a suggestion interface 914. Post field 904 may include a post shared by one user with one or more other users of a social networking service as described in detail above. Suggestion interface 914 corresponds to suggestion interface 514 of FIG. 5. Suggestion interface 914 may be displayed at any location within user interface 902. Suggestion interface 914 may be displayed as embedded in post field 904. User may select an install button in suggestion interface 914 to install the native application suggested as described in FIGS. 5A-5D and FIGS. 6A-6D.

FIG. 10 illustrates an example user interface of an email application running on a mobile device, where the user interface includes a suggestion to install a native application. For example, user interface 1000 may be provided in an implementation of an email application for a mobile device (e.g., computing device 104 of FIG. 1, as described above). User interface 1000 may be provided in association with a server (e.g., server 110 of FIG. 1, as described above) that can be a digital distribution platform for native applications. However, user interface 1000 is not limited thereto. In addition, while the example of FIG. 10 is described with reference to an email application, the subject disclosure is not limited thereto, and can apply to other applications that can access and/or manage emails.

Figure 10A:
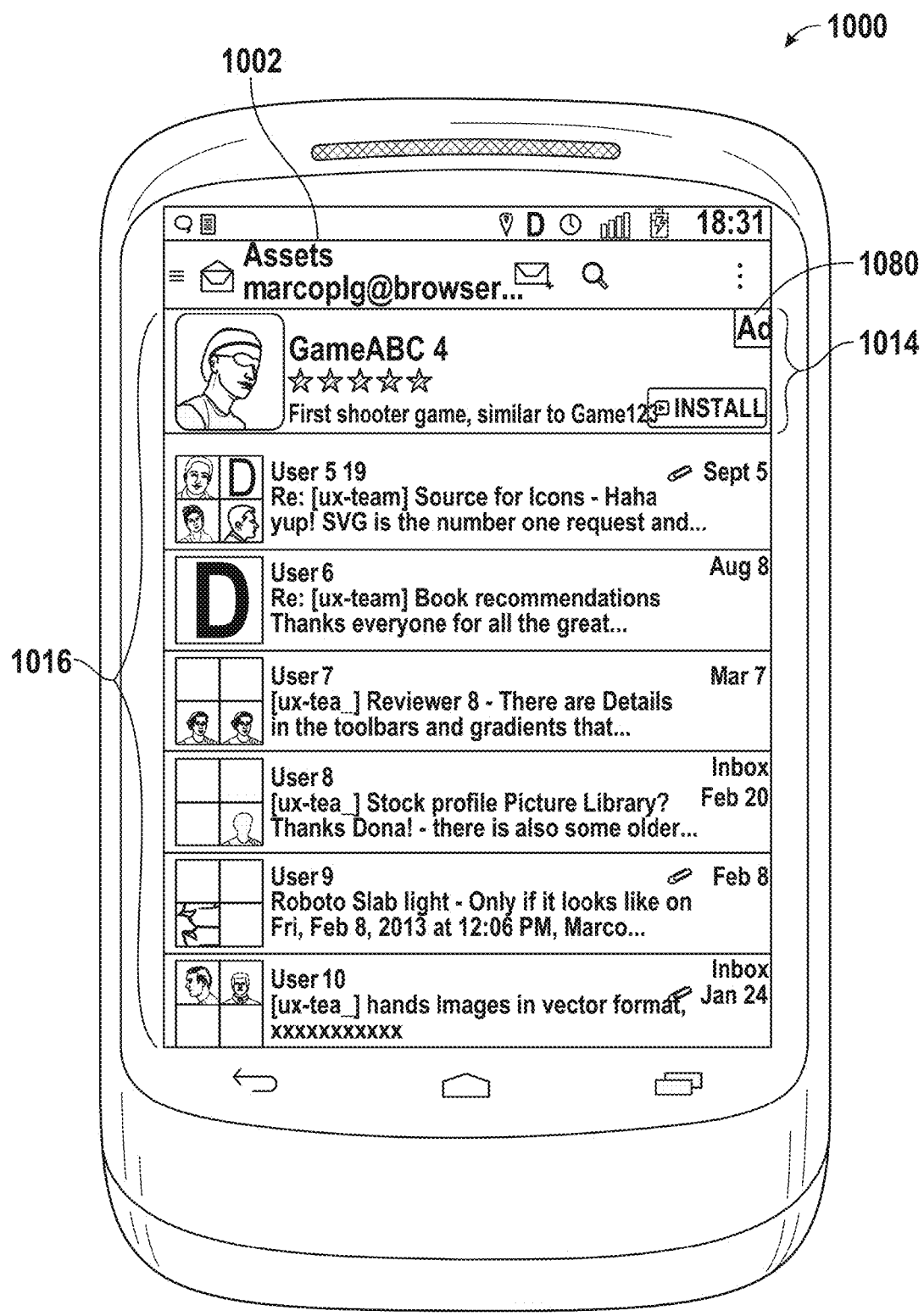
FIGS. 10A-10B illustrate example user interfaces of an email application running on a mobile device, where the user interfaces include a suggestion to install a native application.

User interface 1002 in FIG. 10A includes an email thread area 1016, a suggestion interface 1014 and an advertisement icon 1080. Email thread area 1016 may include one or more email threads. Suggestion interface 1014 corresponds to suggestion interface 402 as described in FIG. 4 with an additional advertisement icon 1080. Suggestion interface 1014 may be displayed at any location within user interface 1002. Suggestion interface 1014 may be displayed as embedded in user interface 1002. Advertisement icon 1080 may indicate that suggestion interface 1014 is a paid advertisement. User may select an install button in suggestion interface 1014 to install the native application suggested as described in FIGS. 5A-5D and FIGS. 6A-6D.

Figure 10B:
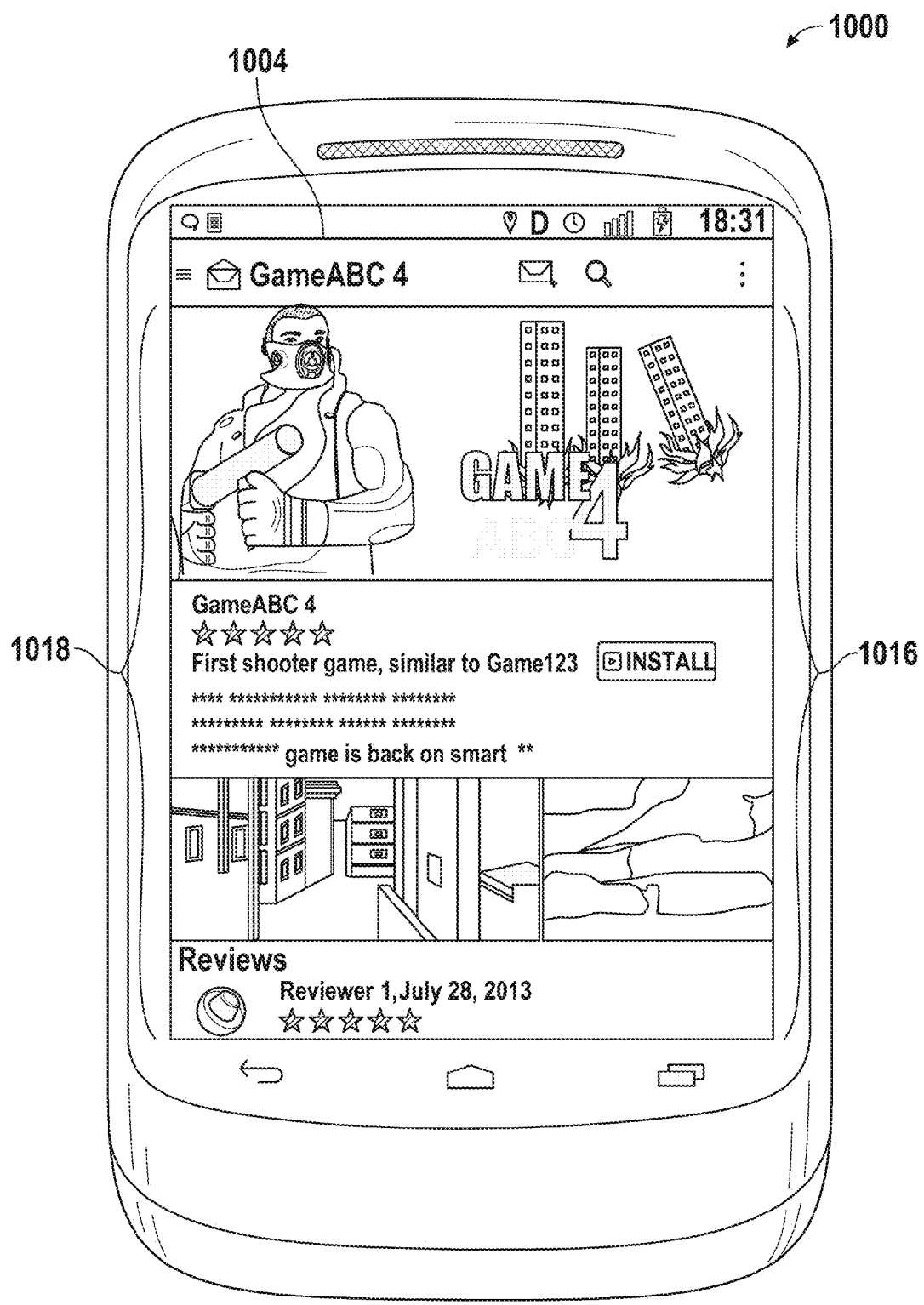

Upon selecting suggestion interface 1014 without initiating the installation process (e.g., selecting an install button), user interface 1004 is displayed in FIG. 10B. Selecting of suggestion interface 1014 may include, for example, tapping on (e.g., via touch input or stylus input), clicking (e.g., via mouse), scrolling, and/or touching suggestion interface 1014 without activating the installation process (e.g., an install button). User interface 1004 includes email thread area 1016 and a suggestion interface 1018. Suggestion interface 1018 corresponds to suggestion interface 404 as described in FIG. 4. Suggestion interface 1018 may be displayed at any location within user interface 1004. Suggestion interface 1018 may be displayed as embedded in user interface 1004. User may select an install button in suggestion interface 1018 to install the native application suggested as described in FIGS. 5A-5D and FIGS. 6A-6D.

Figure 11:
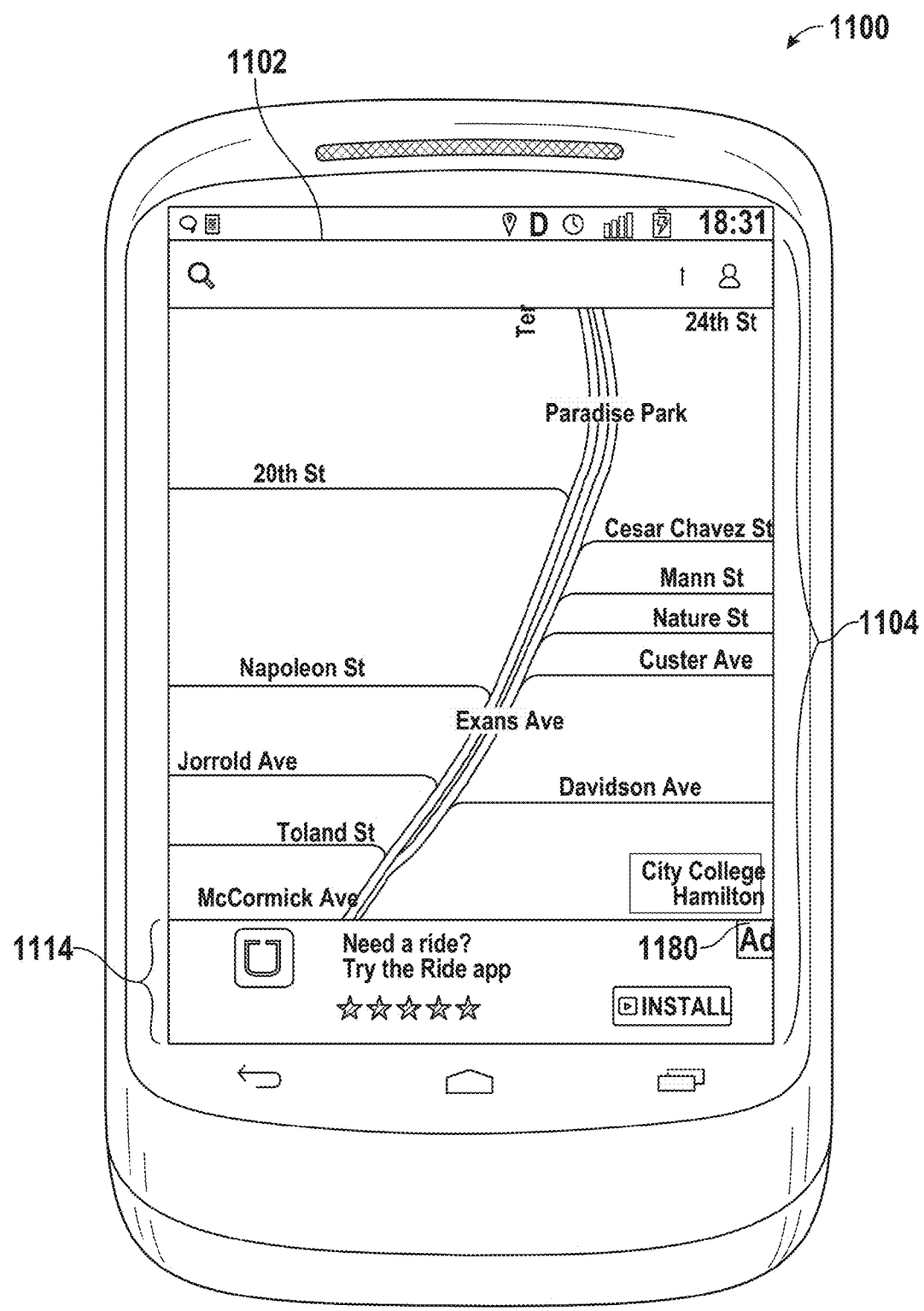
FIG. 11 illustrates an example user interface of a map application running on a mobile device, where the user interface includes a suggestion to install a native application.

FIG. 11 illustrates an example user interface of a map application running on a mobile device, where the user interface includes a suggestion to install a native application. For example, user interface 1100 may be provided in an implementation of a map application for a mobile device (e.g., computing device 104 of FIG. 1, as described above). User interface 1100 may be provided in association with a server (e.g., server 110 of FIG. 1, as described above) that can be a digital distribution platform for native applications. However, user interface 1100 is not limited thereto. In addition, while the example of FIG. 11 is described with reference to a map application, the subject disclosure is not limited thereto, and can apply to other applications that can provide location services.

User interface 1102 in FIG. 11 includes a map area 1104, a suggestion interface 1114 and an advertisement icon 1180. Suggestion interface 1114 corresponds to suggestion interface 514 as described in in FIG. 5 with an additional advertisement icon 1180. Suggestion interface 1114 may be displayed at any location within user interface 1102. Suggestion interface 1114 may be displayed as an overlay on map area 1104. Advertisement icon 1180 may indicate that suggestion interface 1114 is a paid advertisement. User may select an install button in suggestion interface 1114 to install the native application suggested as described in FIGS. 5A-5D and FIGS. 6A-6D.

Figure 12:
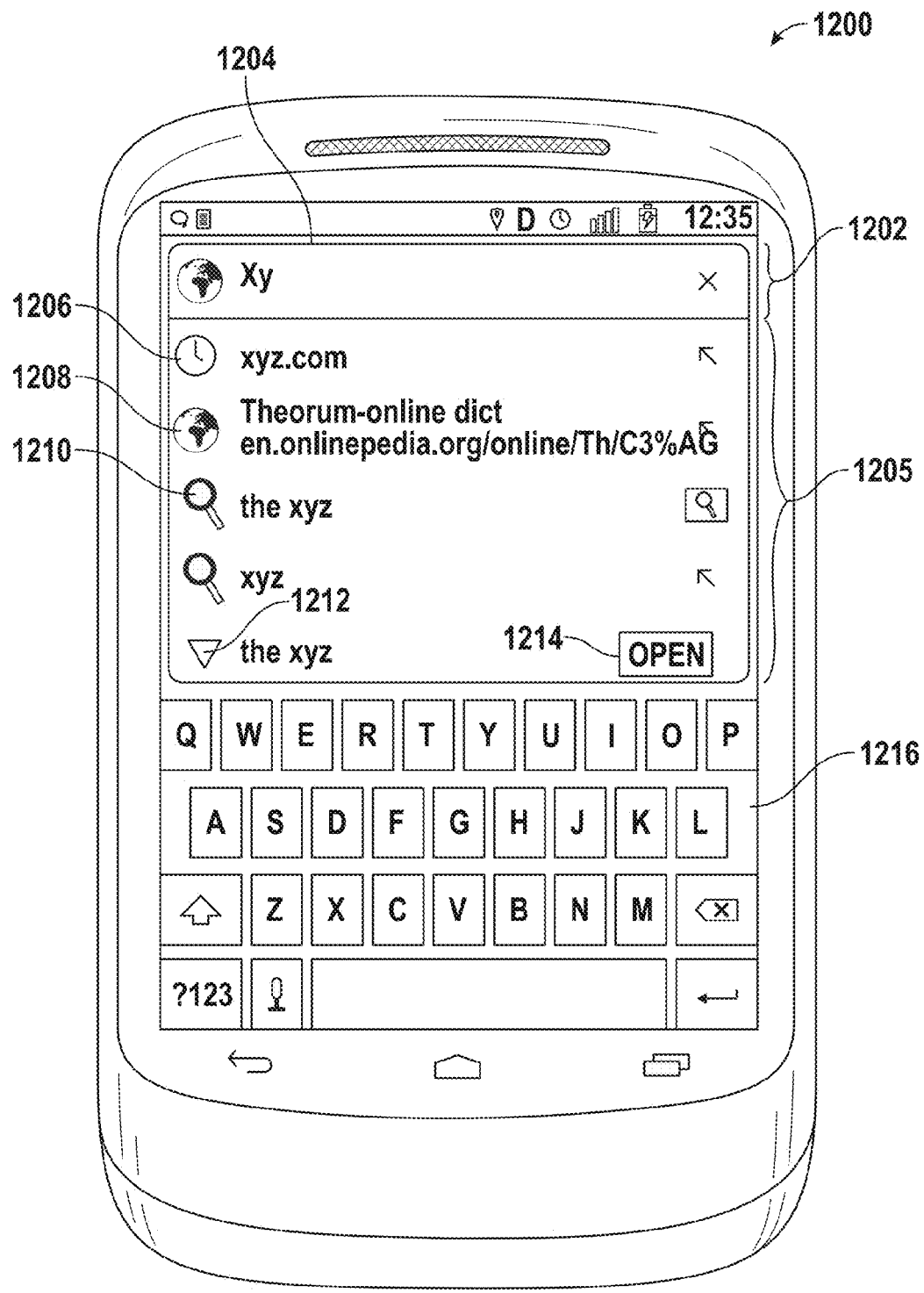
FIG. 12 illustrates an example user interface of providing a suggestion to open a native application.

FIG. 12 illustrates an example user interface of providing a suggestion to open a native application. For example, user interface 1200 may be provided in an implementation of a search application for a mobile device (e.g., computing device 104 of FIG. 1, as described above). User interface 1200 may be provided in association with a server (e.g., server 110 of FIG. 1, as described above) that can be a digital distribution platform for native applications. However, user interface 1200 is not limited thereto. In addition, while the example of FIG. 12 is described with reference to a search application, the subject disclosure is not limited thereto, and can apply to other applications which include a search field for initiating a search (e.g., a web-based search). User interface 1200 may include a keyboard 1216, which is implemented in software as a soft keyboard for a touchscreen display of the mobile device.

User interface 1200 includes a search field 1204 that enables a user at the computing device to enter at least a portion of a search term and/or URL. Search field 1204 includes an input box 1202 for user input. The user may initiate web searches based on partial entry of a search term entered by the user into input box 1202.

Search field 1204 provides for a suggestion interface 1205. Suggestion interface 1205 can be a drop-down list interface. Suggestion interface 1205 can provide suggestions to the user, based on the entry (or partial entry) of a user-entered term within search field 1204.

These suggestions can include, but are not limited to, search term suggestions and/or URL suggestions to the user. One or more search term suggestions and/or URL suggestions are obtained corresponding to the user input according to the process in step 306 of FIG. 3. As described in details in step 308 of FIG. 3, a determination can be made that a native application corresponds to the user input within search field 1204 and the native application is installed, for example, on the mobile device. The suggestions in suggestion interface 1205 can include suggestions to open the native applications determined as described above.

In the example of FIG. 12, the user enters the term "xy" within input box 1202, and suggestions are provided within suggestion interface 1205 based on the term "xy." In this regard, URL suggestions, for example, associated with the user's browsing history are indicated by icon 1206, which is depicted as a history icon. URL suggestions, for example, associated with related sites are indicated by icon 1208, which is depicted as a Globe icon. Search term suggestions displayed within suggestion interface 1205 are indicated by icon 1210, which is depicted as a magnifying glass. It should be noted that a history icon, a Globe icon and a magnifying glass are examples of images that can be used for icons 1206, 1208 and 1210, and that other images (or no image) can be used.

Suggestions to open one or more native applications are indicated by icon 1212, which is depicted as the icon of the native application. It should be noted that the icon of the native application is an example of images that can be used for icon 1212, and that other images (or no image) can be used. User may select open button 1214 to open the native application suggested, which is indicated by icon 1212.

Figure 13:
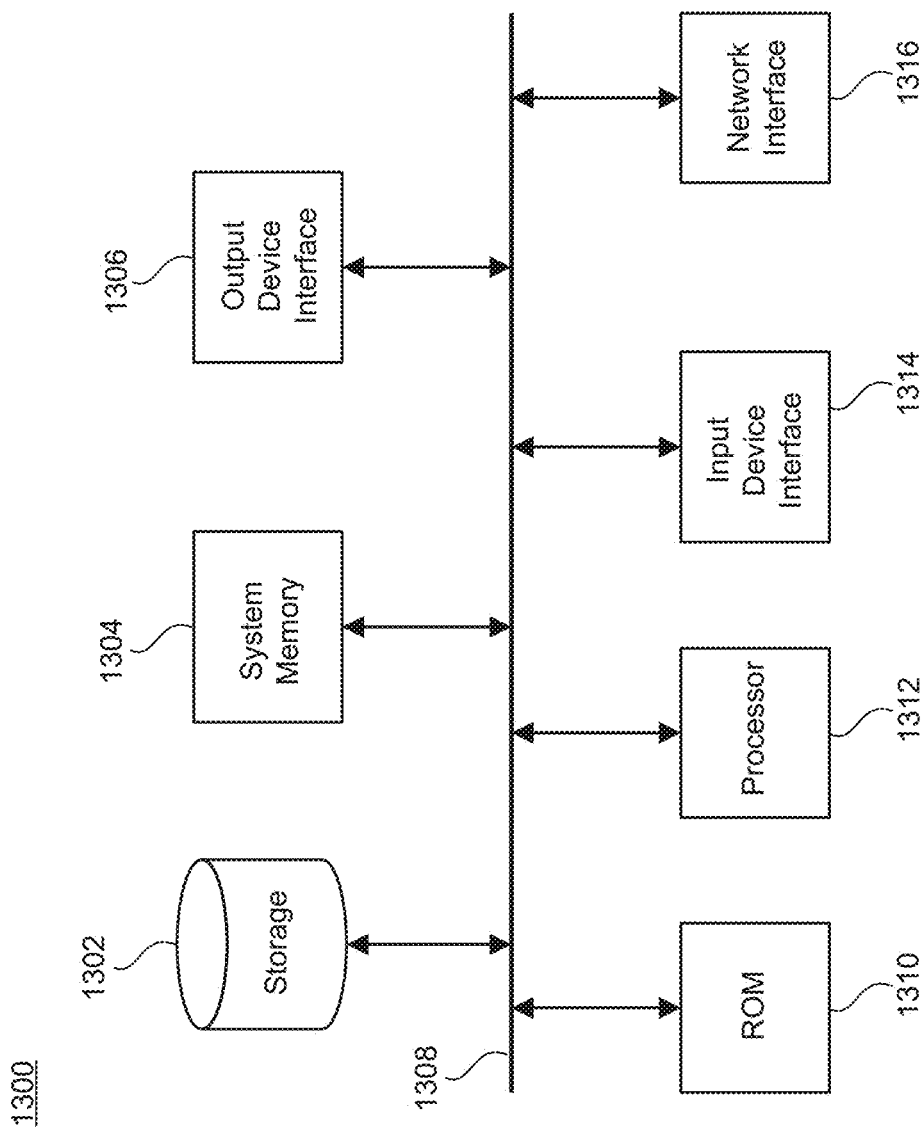
FIG. 13 conceptually illustrates an example electronic system with which some implementations of the subject technology can be implemented.

FIG. 13 conceptually illustrates an example electronic system with which some implementations of the subject technology can be implemented. Electronic system 1300 can be a computer, phone, PDA, or any other sort of electronic device. Such an electronic system includes various types of computer readable media and interfaces for various other types of computer readable media. Electronic system 1300 includes a bus 1308, processing unit(s) 1312, a system memory 1304, a read-only memory (ROM) 1310, a permanent storage device 1302, an input device interface 1314, an output device interface 1306, and a network interface 1316.

Bus 1308 collectively represents all system, peripheral, and chipset buses that communicatively connect the numerous internal devices of electronic system 1300. For instance, bus 1308 communicatively connects processing unit(s) 1312 with ROM 1310, system memory 1304, and permanent storage device 1302.

From these various memory units, processing unit(s) 1312 retrieves instructions to execute and data to process in order to execute the processes of the subject disclosure. The processing unit(s) can be a single processor or a multi-core processor in different implementations.

ROM 1310 stores static data and instructions that are needed by processing unit(s) 1312 and other modules of the electronic system. Permanent storage device 1302, on the other hand, is a read-and-write memory device. This device is a non-volatile memory unit that stores instructions and data even when electronic system 1300 is off. Some implementations of the subject disclosure use a mass-storage device (for example, a magnetic or optical disk and its corresponding disk drive) as permanent storage device 1302.

Other implementations use a removable storage device (for example, a floppy disk, flash drive, and its corresponding disk drive) as permanent storage device 1302. Like permanent storage device 1302, system memory 1304 is a read-and-write memory device. However, unlike storage device 1302, system memory 1304 is a volatile read-and-write memory, such a random access memory. System memory 1304 stores some of the instructions and data that the processor needs at runtime. In some implementations, the processes of the subject disclosure are stored in system memory 1304, permanent storage device 1302, or ROM 1310. For example, the various memory units include instructions for providing suggestions related to native applications in accordance with some implementations. From these various memory units, processing unit(s) 1312 retrieves instructions to execute and data to process in order to execute the processes of some implementations.

Bus 1308 also connects to input and output device interfaces 1314 and 1306. Input device interface 1314 enables the user to communicate information and select commands to the electronic system. Input devices used with input device interface 1314 include, for example, alphanumeric keyboards and pointing devices (also called "cursor control devices"). Output device interfaces 1306 enables, for example, the display of images generated by the electronic system 1300. Output devices used with output device interface 1306 include, for example, printers and display devices, for example, cathode ray tubes (CRT) or liquid crystal displays (LCD). Some implementations include devices, for example, a touchscreen that functions as both input and output devices.

Finally, as shown in FIG. 13, bus 1308 also couples electronic system 1300 to a network (not shown) through a network interface 1316. In this manner, the computer can be a part of a network of computers (for example, a local area network ("LAN"), a wide area network ("WAN"), or an Intranet, or a network of networks, for example, the Internet. Any or all components of electronic system 1300 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as computing devices. The processes and logic flows can be performed by one or more programmable processors and by one or more programmable logic circuitry. General and special purpose computing devices and storage devices can be interconnected through communication networks.

Some implementations include electronic components, for example, microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. A system for providing a suggestion to open a previously installed native application, the system comprising:
   one or more processors; and
      a non-transitory machine-readable medium comprising instructions stored therein, which when executed by the processors, cause the processors to perform operations comprising:
      receiving user input via a search field of an application, the user input including at least partial entry of a search term;
      obtaining one or more search term predictions corresponding to the at least partial entry of the search term, wherein at least one of the one or more search term predictions includes a uniform resource locator (URL) suggestion;
      determining, in response to obtaining the one or more search term predictions, that the URL suggestion of the at least one of the one or more search term predictions is associated with at least one native application of a plurality of native applications installed on the system, the at least one native application being configured to handle the URL suggestion, wherein the determining comprises filtering out native applications of the plurality of native applications corresponding to web browsers configured to handle one or more URL suggestions associated with the user input, wherein the filtering comprises comparing one or more characters in the user input to meta information associated with the at least one native application; and displaying the one or more search term predictions, together with a suggestion to open the at least one native application, as user-selectable entries in association with the search field.

2. The system of claim 1, further comprising:
receiving user selection of the suggestion to open the at least one native application; and
opening, in response to receiving the user selection, the at least one native application.

3. The system of claim 1, wherein the search field is configured to receive input for a web-based search.

4. The system of claim 1, wherein the application is a web browser.

5. The system of claim 1, wherein the suggestion to open the at least one native application comprises at least one of a name or an icon for the native application.

6. The system of claim 5, wherein the suggestion further comprises an indication to open the native application.

7. The system of claim 1, wherein the user-selectable entries are displayed within a drop-down list interface associated with the search field.

8. A machine-implemented method of providing a suggestion to open a previously installed native application, the method comprising:
receiving user input via a search field of an application running on an electronic device, the user input including at least partial entry of a search term;
obtaining one or more search term predictions corresponding to the user input, wherein at least one of the one or more search term predictions includes a uniform resource locator (URL) suggestion;
determining, in response to obtaining the one or more search term predictions, that the URL suggestion of the at least one of the one or more search term predictions is associated with a native application of a plurality of native applications installed on the electronic device, the native application being configured to handle the URL suggestion, wherein the determining comprises filtering out native applications corresponding to web browsers configured to handle one or more URL suggestions associated with the user input, wherein the filtering comprises comparing one or more characters in the user input to meta information associated with the native application;
displaying the one or more search term predictions, together with a suggestion to open the native application, as user-selectable entries in association with the search field;
receiving user selection of the suggestion to open the native application; and
opening, in response to receiving the user selection, the native application.

9. A system for providing an interface to install an application, the system comprising:
one or more processors; and
a non-transitory machine-readable medium comprising instructions stored therein, which when executed by the processors, cause the processors to perform operations comprising:
providing for display an application associated with a client device;
accessing a website on the application, the website comprising metadata for identifying a native application, wherein the native application provides functionality associated with the website;
obtaining, from the metadata, a unique identifier of the native application for downloading from a server;
transmitting, to the server, a request for identifying information of the native application, the request including the obtained unique identifier, wherein at least a portion of the unique identifier is compared to meta information of each native application of a plurality of native applications to filter out native applications of the plurality of native applications configured to handle the functionality associated with the website;
receiving, from the server and in response to the transmitting, the identifying information of a native application from the filtered plurality of native applications; and providing for display a user interface identifying an option to install the native application, the user interface including at least part of the identifying information and a graphical component associated with the option to install the native application, the option to install the native application in the displayed user interface and at least in part content of the displayed application being displayed concurrently.

10. The system of claim 9, further comprising:
receiving user selection of the graphical component; and
initiating, in response to receiving the user selection, an inline installation of the native application between the server and the client device.

11. The system of claim 10, wherein the inline installation is performed via respective application interfaces (APIs) of the server and the client device.

12. The system of claim 9, wherein the identifying information comprises at least one of a name, one or more social annotations, one or more user ratings, or a price of the native application.

13. The system of claim 9, wherein the server is a digital distribution platform for installing native applications.

14. The system of claim 9, wherein the user interface is displayed as an overlay relative to the application.

15. The system of claim 9, wherein the operations further comprise refraining from re-directing to an installation page for the native application on the server.

16. The system of claim 9, wherein the application is a web browser.

17. The system of claim 9, wherein the metadata comprises a metatag or HTML code for identifying the native application.

18. A machine-implemented method of providing an interface to install an application, the method comprising:
providing for display an application running on an electronic device;
accessing a website on the application, the website comprising metadata for identifying a native application, wherein the native application provides functionality associated with the website;
obtaining, from the metadata, a unique identifier of the native application for downloading from a server;
transmitting, to the server, a request for identifying information of the native application, the request including the obtained unique identifier, wherein at least a portion of the unique identifier is compared to meta information of each native application of a plurality of native applications to filter out native applications of the plurality of native applications configured to handle the functionality associated with the website;

receiving, from the server and in response to the transmitting, the identifying information of a native application from the filtered plurality of native applications;

providing for display a user interface identifying an option to install the native application, the user interface including at least part of the identifying information and a graphical component associated with the option to install the native application, the option to install the native application in the displayed user interface and at least in part content of the displayed application being displayed concurrently;

receiving user selection of the graphical component; and initiating, in response to receiving the user selection, an inline installation of the native application between the server and the electronic device.

19. The method of claim 18, wherein the identifying information comprises at least one of a name, one or more social annotations, one or more user ratings, or a price of the native application.

20. The method of claim 18, wherein the user interface is displayed as an overlay relative to the application.

21. The method of claim 18, further comprising refraining from redirecting to an installation page for the native application on the server.

22. The method of claim 18, wherein the metadata comprises a metatag or HTML code for identifying the native application.

23. The system of claim 9, wherein the user interface remains displayed, in response to user selection of the option via the user interface, at a position overlapping at least in part the content of the displayed application during an inline installation of the native application.

24. The system of claim 1, wherein the at least one native application and the URL suggestion are displayed independently in the user-selectable entries.

25. The system of claim 1, wherein the at least one native application corresponds to a related site associated with the URL suggestion.

* * * * *